(12) United States Patent
Khoshnevis

(10) Patent No.: US 8,029,258 B2
(45) Date of Patent: *Oct. 4, 2011

(54) AUTOMATED PLUMBING, WIRING, AND REINFORCEMENT

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,367

(22) Filed: Aug. 20, 2010

(65) Prior Publication Data

US 2010/0318222 A1   Dec. 16, 2010

Related U.S. Application Data

(60) Continuation of application No. 12/249,319, filed on Oct. 10, 2008, which is a division of application No. 11/040,602, filed on Jan. 21, 2005, now Pat. No. 7,452,196, which is a continuation-in-part of application No. 10/760,963, filed on Jan. 20, 2004, now Pat. No. 7,153,454.

(60) Provisional application No. 60/537,756, filed on Jan. 20, 2004, provisional application No. 60/441,572, filed on Jan. 21, 2003.

(51) Int. Cl.
*B28B 23/00* (2006.01)

(52) U.S. Cl. ............ 425/64; 52/425; 52/745.09; 249/20; 425/63; 425/114; 425/375; 700/123; 901/43

(58) Field of Classification Search .................... 425/60, 425/63, 64, 114, 131.1, 126.2, 375; 901/41, 901/43; 52/424, 425, 426, 741.41, 742.13, 742.14, 745.09; 249/20

See application file for complete search history.

(56) References Cited

U.S. PATENT DOCUMENTS

| 984,517 A | 2/1911 | Rollinger |
| 1,578,511 A | 3/1926 | Gladwin |
| 1,620,834 A | 3/1927 | Rhodes |
| 1,797,164 A | 3/1931 | Tashjian |
| 1,836,408 A | 12/1931 | Sutton |

(Continued)

FOREIGN PATENT DOCUMENTS

AT    385550 A    11/1988

(Continued)

OTHER PUBLICATIONS

European Patent Office. Examination Report for EP Application No. 04 704 067.0 (European Regional Phase of PCT/US2004/001535, WO04/065707A2), entitled "Multi-Nozzle Assembly for Extrusion of Wall," mailed Jan. 22, 2010.

(Continued)

*Primary Examiner* — Yogendra Gupta
*Assistant Examiner* — Emmanuel S Luk
(74) *Attorney, Agent, or Firm* — McDermott Will & Emery LLP

(57) ABSTRACT

An apparatus may include a nozzle assembly configured to extrude material through an outlet; and a controllable robotic arm coupled to the nozzle assembly, the robotic arm having at one end a gripper configured to pick up an element and deposit the element at a desired position relative to the extruded material. The element may be one of: a reinforcement member for a structure being constructed; a segment of a plumbing pipe; an electric network component; and a tile.

11 Claims, 33 Drawing Sheets

U.S. PATENT DOCUMENTS

| | | | |
|---|---|---|---|
| 1,920,716 A | | 8/1933 | Schafer |
| 2,652,168 A | | 9/1953 | Nelson et al. |
| 2,837,910 A | * | 6/1958 | Steed ............................... 401/22 |
| 2,877,530 A | | 3/1959 | Winn, Jr. |
| 3,221,457 A | | 12/1965 | Vevoda |
| 3,358,325 A | | 12/1967 | Chisholm |
| 3,372,430 A | | 3/1968 | Lowes |
| 3,376,602 A | | 4/1968 | Lowes |
| 3,412,426 A | * | 11/1968 | O'Dell, Jr. .................... 425/4 R |
| 3,417,429 A | | 12/1968 | Wright |
| 3,562,991 A | | 2/1971 | Kustusch |
| 3,897,298 A | | 7/1975 | Gray |
| 3,922,125 A | | 11/1975 | Christensen |
| 3,966,533 A | | 6/1976 | Goldsworthy et al. |
| 4,050,205 A | | 9/1977 | Ligda |
| 4,066,723 A | | 1/1978 | King et al. |
| 4,403,980 A | | 9/1983 | Simpson et al. |
| 4,517,780 A | | 5/1985 | Lacombe et al. |
| 4,584,964 A | * | 4/1986 | Engel ............................ 118/697 |
| 4,606,169 A | | 8/1986 | Noon et al. |
| 4,833,855 A | | 5/1989 | Winter, IV |
| 4,850,382 A | | 7/1989 | Williams |
| 5,059,266 A | | 10/1991 | Yamane et al. |
| 5,243,800 A | | 9/1993 | Olbrich |
| 5,248,341 A | | 9/1993 | Berry, Jr. et al. |
| 5,373,887 A | | 12/1994 | Glover |
| 5,471,804 A | | 12/1995 | Winter, IV |
| 5,529,471 A | | 6/1996 | Khoshevis |
| 5,596,853 A | | 1/1997 | Blaney et al. |
| 5,617,515 A | | 4/1997 | MacLaren et al. |
| 5,656,230 A | | 8/1997 | Khoshevis |
| 5,664,382 A | | 9/1997 | Melnick et al. |
| 5,749,196 A | | 5/1998 | Bangma |
| 5,848,458 A | * | 12/1998 | Bullen .......................... 29/33 K |
| 5,932,062 A | | 8/1999 | Manser |
| 6,001,181 A | | 12/1999 | Bullen |
| 6,103,161 A | | 8/2000 | Lopez |
| 6,131,365 A | | 10/2000 | Crockett |
| 6,164,035 A | | 12/2000 | Roberts |
| 6,170,220 B1 | | 1/2001 | Moore, Jr. |
| 6,189,269 B1 | | 2/2001 | De Zen |
| 6,210,142 B1 | * | 4/2001 | Huesers et al. ................ 425/60 |
| 6,256,960 B1 | | 7/2001 | Babcock et al. |
| 6,279,279 B1 | | 8/2001 | Larimore |
| 6,363,683 B1 | | 4/2002 | Moore, Jr. |
| 6,423,261 B1 | | 7/2002 | Joseph et al. |
| 6,652,014 B2 | | 11/2003 | Schmalz et al. |
| 6,662,516 B2 | | 12/2003 | Vandehey et al. |
| 6,932,539 B2 | | 8/2005 | Benedict |
| 7,126,489 B2 | | 10/2006 | Tubb et al. |
| 7,153,454 B2 | | 12/2006 | Khoshnevis |
| 7,452,196 B2 | | 11/2008 | Khoshnevis |
| 7,641,461 B2 | | 1/2010 | Khoshnevis |
| 7,837,378 B2 | | 11/2010 | Khoshnevis |
| 2004/0164436 A1 | | 8/2004 | Khoshnevis |
| 2005/0044700 A1 | | 3/2005 | Ghuman et al. |
| 2005/0194401 A1 | | 9/2005 | Khoshnevis |
| 2005/0196482 A1 | | 9/2005 | Khoshnevis |
| 2005/0196484 A1 | | 9/2005 | Khoshnevis |
| 2007/0138678 A1 | | 6/2007 | Khoshnevis |
| 2009/0043424 A1 | | 2/2009 | Khoshnevis |

FOREIGN PATENT DOCUMENTS

| | | |
|---|---|---|
| GB | 892994 B | 4/1962 |
| GB | 2267110 A | 11/1993 |
| JP | 2002-307728 A | 12/1990 |
| WO | 0242056 A1 | 5/2002 |
| WO | 2004065707 A2 | 8/2004 |

OTHER PUBLICATIONS

Khoshnevis, B. et al. 2002. Automated Construction Using Contour Crafting: Applications on Earth and Beyond. International Symposium on Automation and Robotics in Construction, 19th (ISARC). Proceedings. National Institute of Standards and Technology, Gaithersburg, Maryland. Sep. 23-25, 2002, pp. 489-494.

Japanese Office Action, Application No. P2006-501068, (Japanese National Phase of of PCT/US2004/001535, WO04/065707A2), entitled "Multi-Nozzle Assembly for Extrusion of Wall," mailed Nov. 17, 2009.

U.S. Appl. No. 12/249,319, "Automated Plumbing, Wiring, and Reinforcement," (parent to U.S. Appl. No. 12/860,367), Office Action, mailed Feb. 8, 2010.

Japanese Final Rejection, dated Feb. 28, 2011, Application No. P2006-501068, (Japanese National Phase of of PCT/US2004/001535, WO04/065707A2), entitled "Multi-Nozzle Assembly for Extrusion of Wall," mailed Nov. 17, 2009.

* cited by examiner

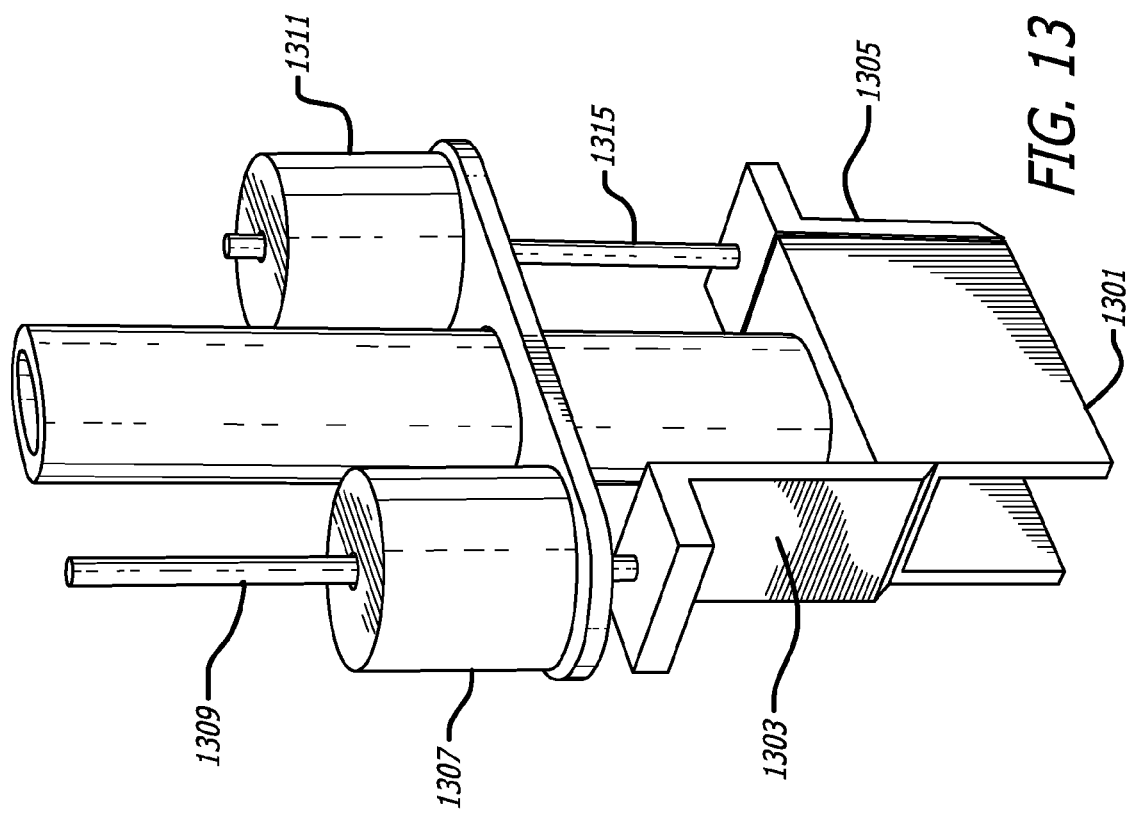
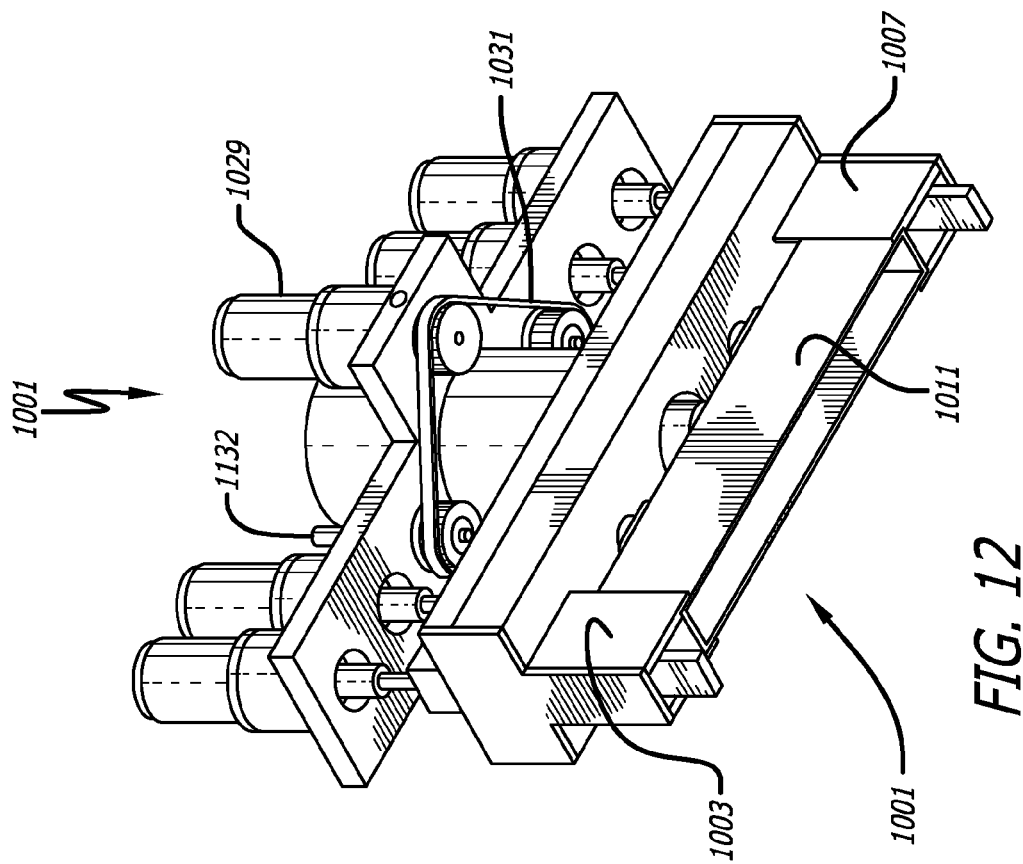
FIG. 13
FIG. 12

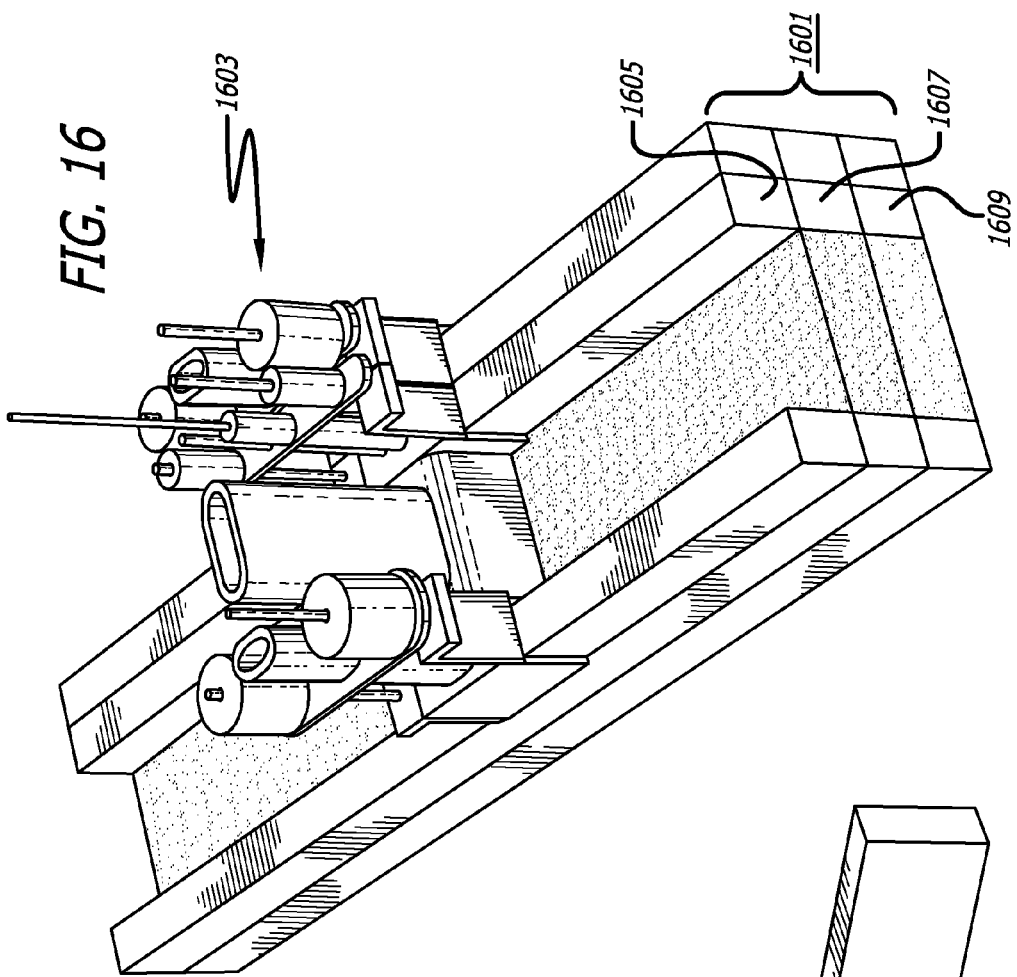
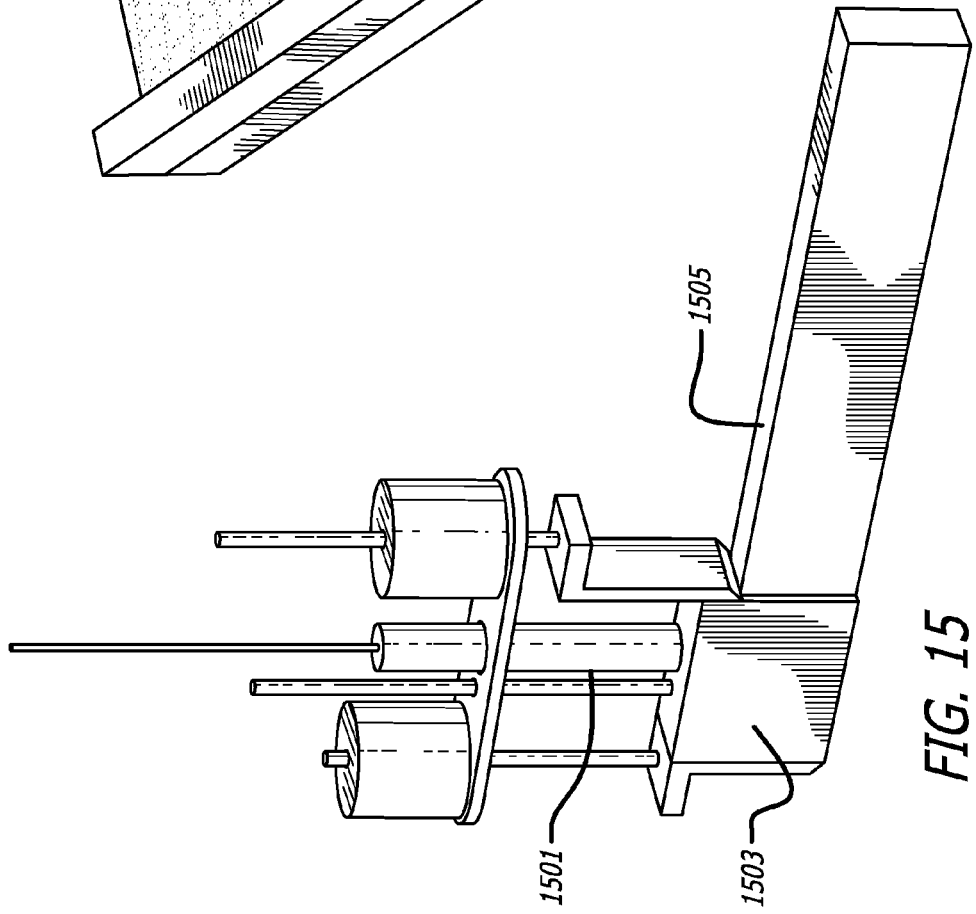

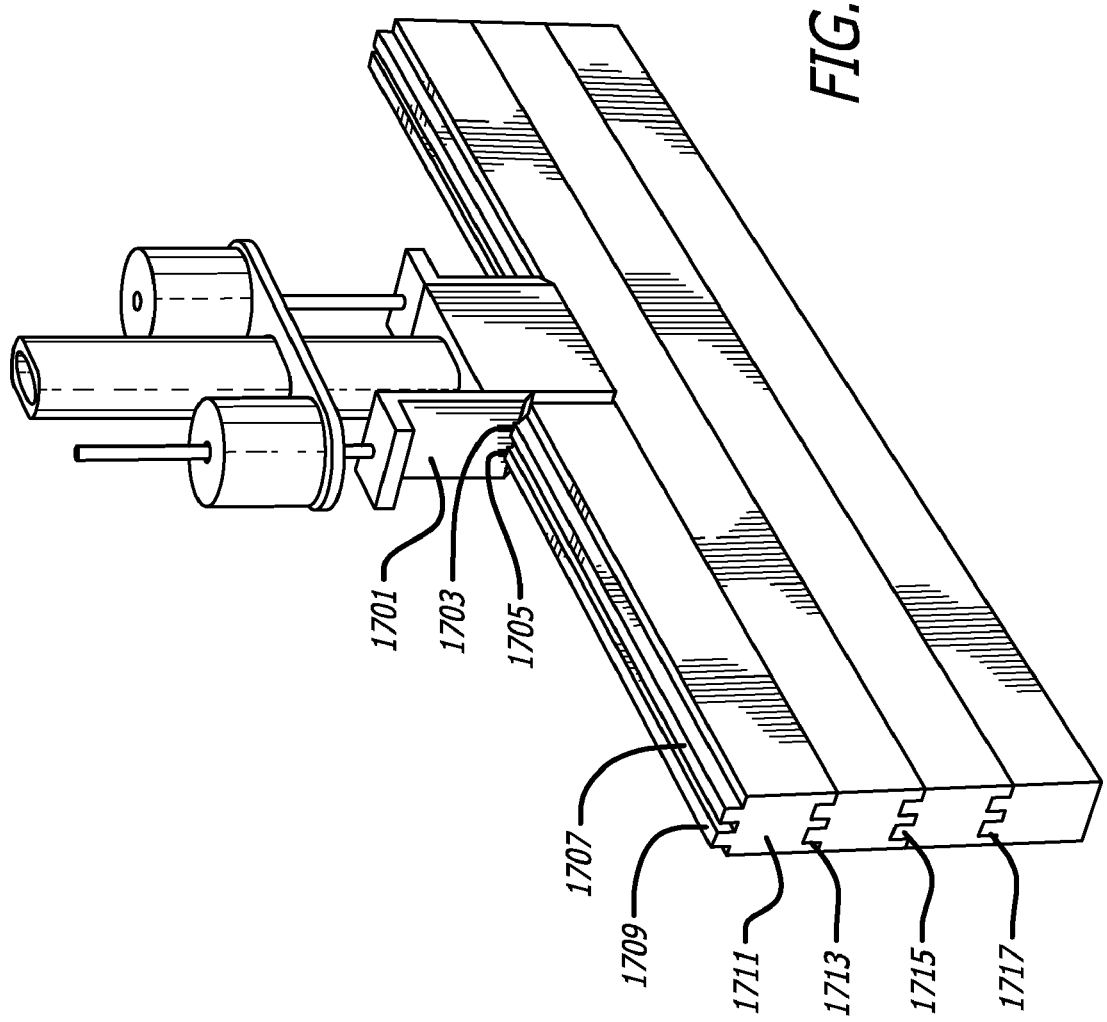

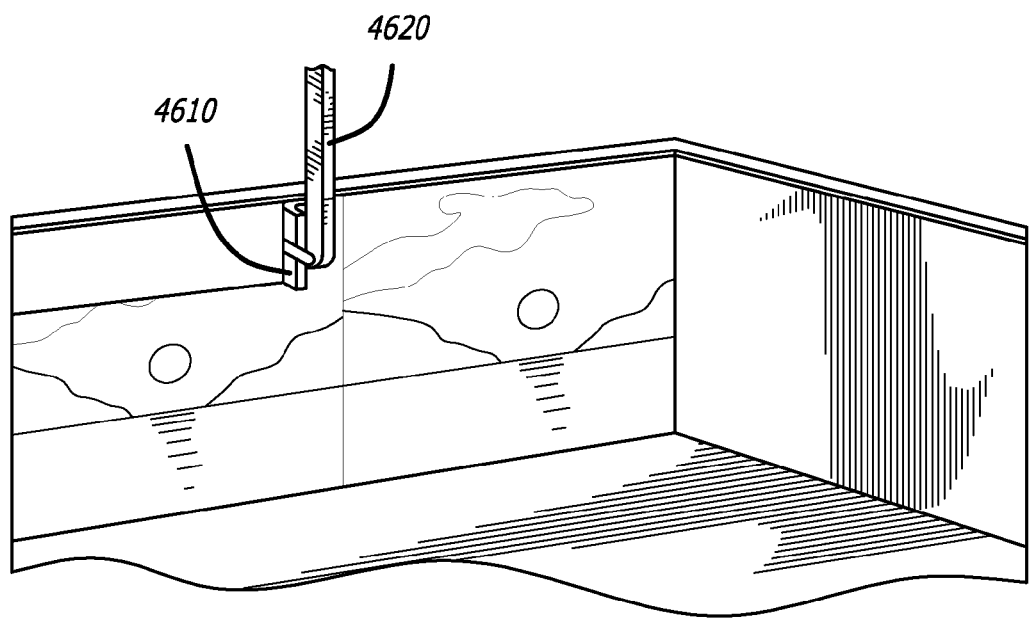
FIG. 46
FIG. 47
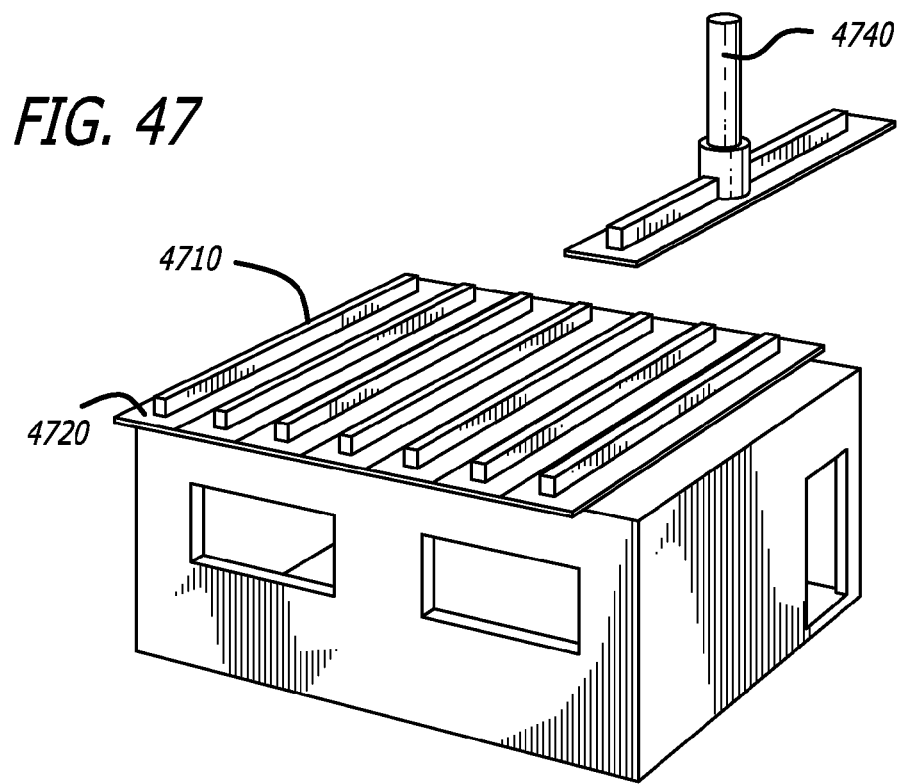

AUTOMATED PLUMBING, WIRING, AND REINFORCEMENT

CROSS-REFERENCE TO RELATED APPLICATIONS

This application is a continuation of U.S. application Ser. No. 12/249,319, filed Oct. 10, 2008, entitled "Automated Plumbing, Wiring, and Reinforcement," by inventor Behrokh Khoshnevis; which is a divisional application of U.S. application Ser. No. 11/040,602, filed Jan. 21, 2005, now U.S. Pat. No. 7,452,196, issued Nov. 18, 2008, entitled "Automated Plumbing, Wiring, and Reinforcement," by inventor Behrokh Khoshnevis; which is based upon and claims priority to U.S. Provisional Application Ser. No. 60/537,756, entitled "Automated Construction Using Extrusion," filed on Jan. 20, 2004, by inventor Behrokh Khoshnevis. U.S. application Ser. No. 11/040,602 is also a continuation-in-part of U.S. application Ser. No. 10/760,963, filed Jan. 20, 2004, now U.S. Pat. No. 7,153,454, issued Dec. 26, 2006, entitled "Multi-Nozzle Assembly for Extrusion of Wall," also by inventor Behrokh Khoshnevis. The '963 application is based upon and claims priority to U.S. Provisional Application 60/441,572, entitled "Automated Construction," filed on Jan. 21, 2003, by inventor Behrokh Khoshnevis. The entire contents of all of these applications are incorporated herein by reference.

U.S. application Ser. No. 11/040,602 is also related to contemporaneously-filed U.S. application Ser. No. 11/040,401, filed Jan. 21, 2005, now U.S. Pat. No. 7,641,461, issued Jan. 5, 2010, entitled "Robotic Systems for Automated Construction," by inventor Behrokh Khoshnevis; and U.S. application Ser. No. 11/040,518, filed Jan. 21, 2005, entitled "Mixer-Extruder Assembly," by inventor Behrokh Khoshnevis. The entire contents of all of these applications are incorporated by reference.

GOVERNMENT'S INTEREST IN APPLICATION

This invention was made with government support under Grant Nos. 9634962 and 9522982 awarded by the National Science Foundation. The government has certain rights in the invention.

BACKGROUND

Constructing homes, offices, boats and other structures has an ancient heritage. Despite all of the centuries of development, however, there can be difficulties and problems.

Construction is usually very labor intensive. Even a modest size structure usually requires the efforts of numerous individuals. This can be very costly. Simultaneously using the time of numerous individuals in an efficient manner can also be challenging.

The results of the construction effort can also be inconsistent. The appearance and quality of one structure can vary from another built from the same design. This can be caused by differences in the skills, efforts, supervision and techniques employed by those that work on the structures.

Construction may also result in wasted material. For example, when wood is used, standard, off-the-shelf lengths must often be cut to meet design requirements, resulting in waste.

Construction using manual labor can also be very time-consuming, requiring months and, in some instances, years to complete.

Construction can also be hazardous. Many construction workers are killed or seriously injured at construction sites, including about 500,000 in the United States alone.

SUMMARY

A multi-nozzle assembly may include a first nozzle configured to extrude material through a first outlet; a second nozzle configured to extrude material through a second outlet; and a third nozzle configured to extrude material through a third outlet, the third outlet being between the first and second outlets.

A construction method may include simultaneously extruding a first layer of two, spaced apart rims. After extruding the first layer of rims, a further layer of two, spaced apart rims may simultaneously be extruded, each directly or indirectly on top of one of the spaced apart rims in the first layer, along with a first layer of filler between the first layer of two, spaced apart rims.

A wall may include a set of spaced apart rims, each comprised of a stacked set of separately-extruded layers; and a filler between the rims comprised of a stacked set of separately-extruded layers.

A robotic system may include a movable gantry robot, and a nozzle assembly movably coupled to the gantry robot. The gantry robot may include an overhead beam extending between, and supported by, at least two side members slidably mounted on a pair of rails. The nozzle assembly may be coupled to the overhead beam of the gantry robot, and may be configured to extrude material through an outlet. The robotic system may further include a position controller configured to control position and movement of the gantry robot and the nozzle assembly.

A construction apparatus may include a movable gantry platform having a cross-member extending between, and slidably mounted across, a pair of opposite side-members. A nozzle assembly may be movably coupled to the cross-member and configured to extrude material through an outlet. A lifting mechanism may be configured to controllably lift the gantry platform to a height sufficient for the nozzle assembly to extrude a layer of material on top of a previously extruded layer of material.

A mobile robotic system may include a movable robotic base; an articulated robotic arm extending from the robotic base; a nozzle assembly coupled to a distal end of the robotic arm and configured to extrude material through an outlet; and a material feeding system mounted on the robotic base and configured to feed material to the nozzle assembly.

A mobile robotic system may include a motorized wheel assembly; a nozzle assembly coupled to the motorized wheel assembly and configured to extrude material through an outlet; and a material feed system mounted on the motorized wheel assembly and configured to feed material to the nozzle assembly.

An apparatus may include a nozzle assembly configured to extrude material through an outlet; and a controllable robotic arm coupled to the nozzle assembly, the robotic arm having at one end a gripper configured to pick up an element and deposit the element at a desired position relative to the extruded material.

An apparatus may include a nozzle assembly configured to extrude material through an outlet; a controllable robotic arm coupled to the nozzle assembly; and a painting mechanism attached to one end thereof, the painting mechanism configured to controllably paint a surface of extruded material, in accordance with a desired specification.

A three-dimensional structure may include a set of spaced apart rims, each comprised of a stacked set of separately extruded layers; a filler between the rims comprised of a stacked set of separately-extruded layers; a plurality of conduits defined at least in part by the spaced apart rims and the filler; and one or more elements installed within at least some of the conduits. The elements may include reinforcement members; segments of a plumbing pipe; and electric network components.

A method of installing tiles may include manipulating a robot to induce the robot to apply a layer of adhesive material on a surface of material extruded and shaped by a nozzle assembly; and operating the robot to cause the robot to pick up one or more tiles and to deposit the tiles at desired locations over the layer of adhesive material.

A mixer-extruder assembly may include a hollow cylindrical chamber and a hopper connected to the chamber. The chamber may include an outlet port at a lower end thereof, and a fluid inlet port. The hopper may have an input port configured to receive input material therethrough. A piston drive shaft having a piston attached at one end may be rotatable about a drive shaft axis that is coaxial with the cylindrical chamber. The piston may have one or more mixer blades coupled thereto and rotatable therewith. The piston be controllably rotated about the drive shaft axis, after input material received through the input port of the hopper is delivered into the chamber, causing the mixer blades to rotate and mix the input material with mixing fluid introduced through the fluid inlet port of the chamber. The piston may also be slidably movable from an upper end of the chamber toward the outlet port of the chamber, so that the mixed input material is extruded through the output port of the chamber.

A method of mixing and extruding material may include providing powderized material to a hopper connected to a substantially cylindrical chamber; transferring at least some of the powderized material from the hopper to the extrusion chamber; introducing mixing fluid into the extrusion chamber; and rotating a piston within the chamber about a drive axis that is coaxial with the cylindrical chamber. The piston may have one or more mixing blades coupled thereto and rotatable therewith, so that the rotation of the piston causes the mixing blades to mix the powderized material with the mixing fluid. The method may further include moving the piston from an upper end of the chamber toward an outlet port of the chamber, so that the powderized material mixed with the mixing fluid is extruded from the chamber through the outlet port.

BRIEF DESCRIPTION OF DRAWINGS

FIG. 12 illustrates a bottom view of a portion of the nozzle assembly shown in FIG. 10.

FIG. 13 illustrates an embodiment of a nozzle including a controllable front and rear gate.

FIG. 15 illustrates the nozzle shown in FIG. 13 being used to extrude an insulation layer.

FIG. 16 illustrates a nozzle assembly using the nozzle shown in FIG. 13 being used to extrude a wall with a layer of insulation.

FIG. 17 illustrates another embodiment of a nozzle assembly having slots in a gate being used to extrude a wall with interlocked layers.

FIG. 46 illustrates automated painting of surfaces of constructed structures.

FIG. 47 illustrates automated roof construction.

DETAILED DESCRIPTION

Figure 1:
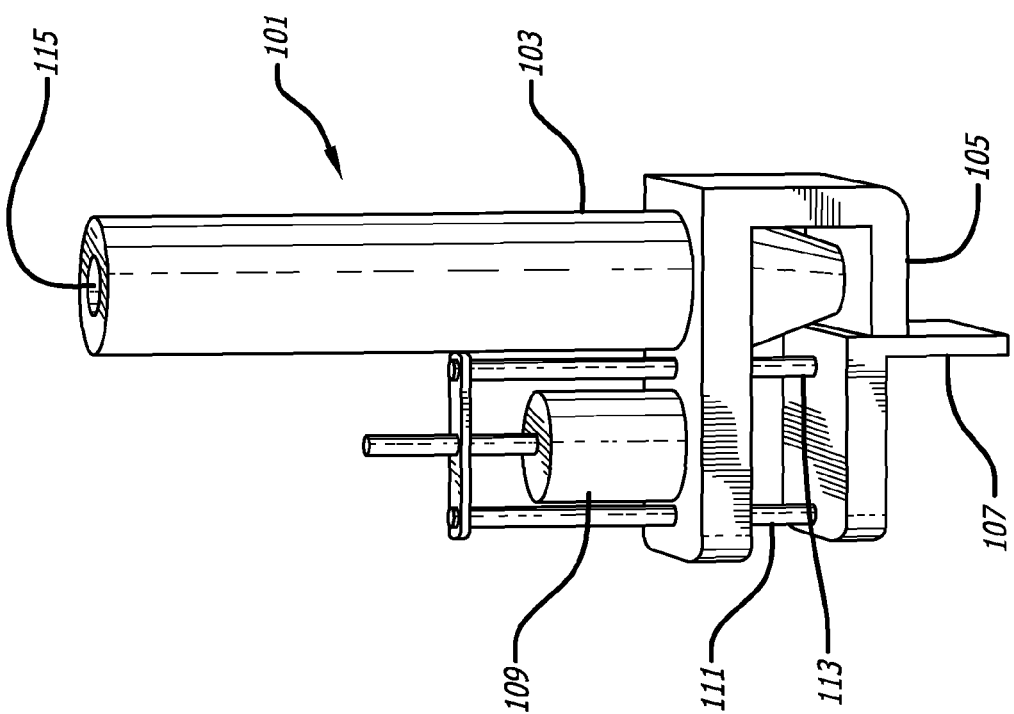
FIG. 1 illustrates one embodiment of a nozzle assembly that includes a single nozzle.

FIG. 1 illustrates an embodiment of a nozzle assembly that includes a single nozzle. As shown in FIG. 1, a nozzle assembly 101 may include a nozzle 103 having an outlet 105 (not visible in FIG. 1), a trowel 107, and a trowel positioning controller, including a servo motor 109 and trowel linkage 111 and 113.

Although shown as cylindrical, the shape of the nozzle 103 may vary. It may include an inlet 115 for material in a fluid or semi-fluid form.

The cross-section of the outlet 105 may vary. It may be circular, rectangular or of some other shape.

Figure 2:
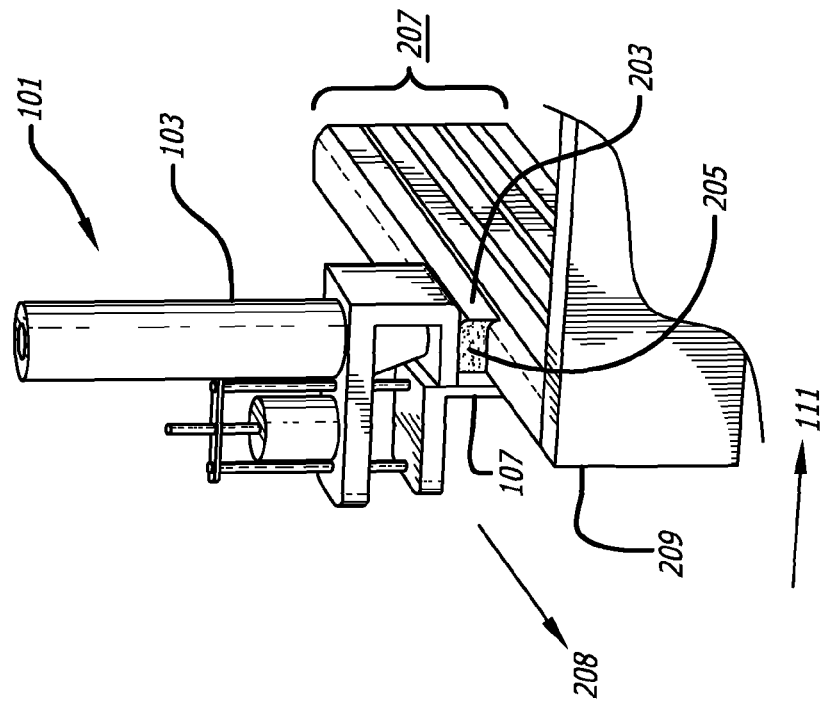
FIG. 2 illustrates the embodiment of the nozzle assembly shown in FIG. 1 being used to extrude a wall.

FIG. 2 illustrates the embodiment of the nozzle assembly shown in FIG. 1 being used to extrude a wall. As shown in FIG. 2, the nozzle assembly 101 is extruding a layer of material 203 while being moved in a horizontal direction 208. The trowel 107 smoothens the exterior surface of the layer of material 203 as it is being extruded from the nozzle 103. The lower surface 205 of the member that supports the nozzle 103 has an opening (not shown) through which the extruded material flows. The lower surface 205 may also act as a trowel to smoothen the upper surface of the layer of material 203 that is being extruded. An additional trowel (not shown) may also be included to smoothen the interior surface of the layer 203 that is being extruded. Alternatively, a sharp blade parallel to the first trowel may cut out excess material on the interior side to create a planar surface.

Referring again to FIG. 1, the height of the trowel 107 may be controlled by the trowel position controller which, as explained above, includes the servo motor 109 and the trowel linkages 111 and 113. The height of the trowel 107 may be adjusted to correspond to the height of the extruded layer 203.

By making the height of the trowel 107 adjustable, layers of different thickness may be extruded.

Although the smoothening surface of the trowel 107 and the underneath surface 205 are illustrated as being flat, other contours may be used instead.

Any type of material may be used and delivered into the inlet 115, including cement or plastic. The material may be delivered in a liquid or quasi-liquid form and may include or receive additives or may have characteristics that cause the material to harden into a solid after extrusion.

As is apparent from an examination of FIG. 2, the nozzle assembly 101 may be moved horizontally in a back-and-forth motion, each time being elevated in height by approximately the thickness of each extruded layer. The collective effect is to create a wall 207 consisting of a stacked set of separately-extruded layers.

The horizontal direction 208 of the nozzle assembly 101 at the end 209 of a pass may be altered by 90 degrees into the direction 111. This can produce an extruded wall that has a sharp right angle bend. Obviously, other types of changes in direction may be used to create other wall shapes, including curved walls and walls that join one another at angles other than 90 degrees.

Figure 3:
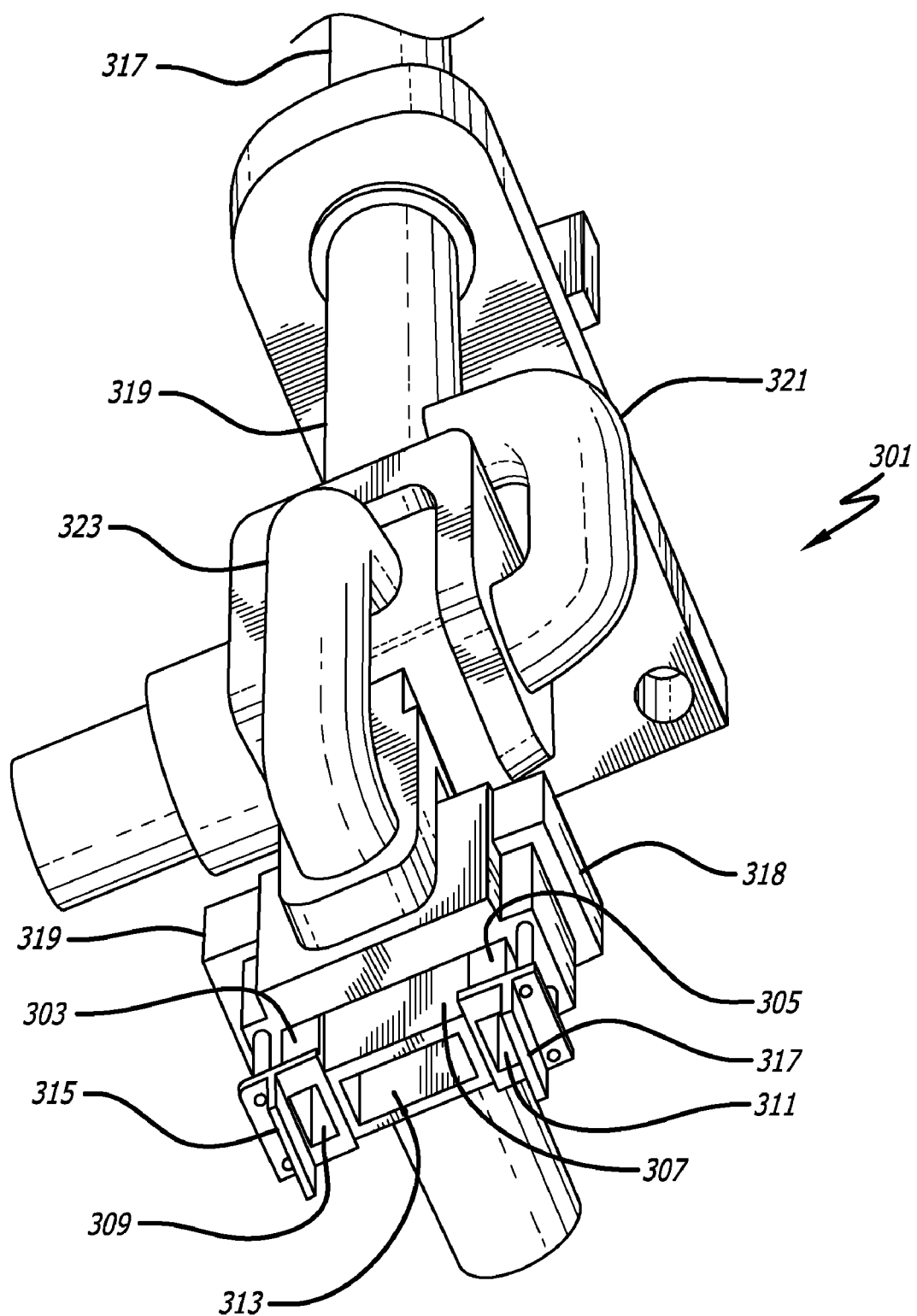
FIG. 3 illustrates another embodiment of a nozzle assembly that includes three nozzles.

FIG. 3 illustrates another embodiment of a nozzle assembly that includes three nozzles. As shown in FIG. 3, a nozzle assembly 301 includes an exterior nozzle 303, an interior nozzle 305 and a central nozzle 307. The exterior nozzle 303 may include an outlet 309, the interior nozzle 305 may include an outlet 311, and the central nozzle 307 may include an outlet 313. Although each outlet is illustrated as having a rectangular cross-section, other cross-sectional shapes could be used instead, such as round or oval. The width of the central outlet 313 may be equal to, greater or less than the width of the exterior outlet 309 or the interior outlet 311. The width of the exterior outlet 309 may be equal to or different than the width of the interior outlet 311

A trowel 315 may be used to smooth the material that is extruded from the exterior outlet 309, while a trowel 317 may be used to smooth the material that is extruded from the interior outlet 311. The height of the exterior trowel 315 and the interior trowel 311 may, in turn, be controlled by trowel position controllers 319 and 318, respectively.

Figure 4A:
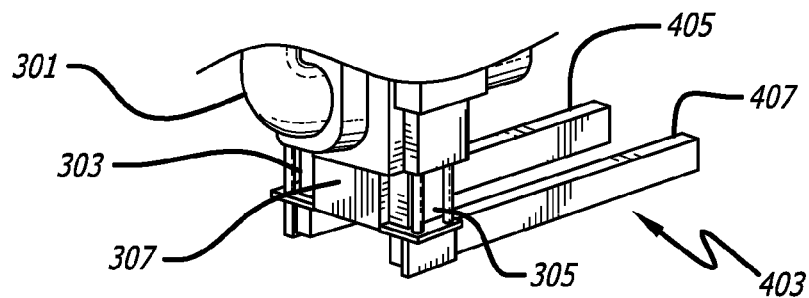
FIGS. 4(a)-(c) illustrate the embodiment of the nozzle assembly shown in FIG. 3 being used to extrude a wall.
Figure 4B:
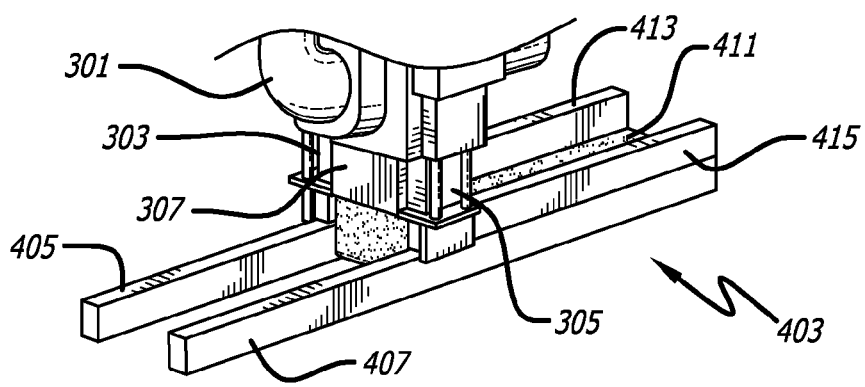
Figure 4C:
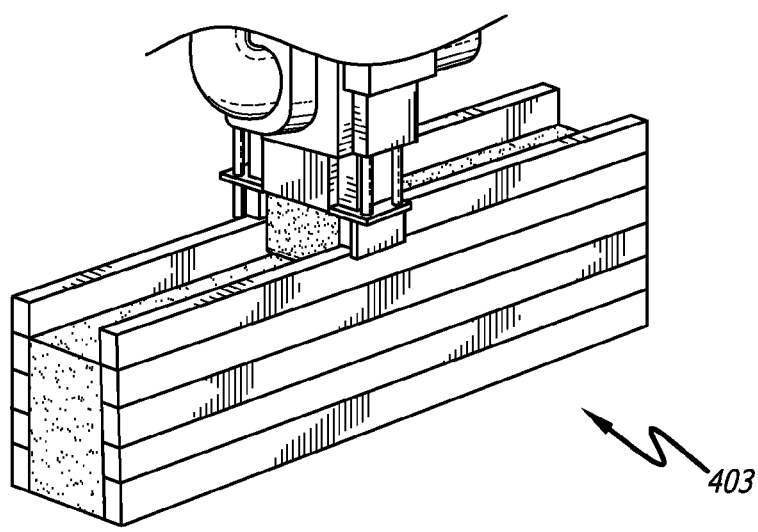

FIGS. 4(a)-(c) illustrate the embodiment of the nozzle assembly shown in FIG. 3 being used to extrude a wall.

As shown in FIG. 4(a), a first layer of a wall 403 may be extruded by moving the nozzle assembly 301 in a horizontal direction and by extruding material only through the exterior nozzle 303 and the interior nozzle 305. During this pass, no material may be extruded from the central nozzle 307.

This approach may cause an exterior rim layer 405 and an interior rim layer 407 of material to be extruded. Since no material is being extruded during this pass from the central nozzle 307, no significant force will be placed on the interior walls of the rim layers 405 and 407.

The rim layers may then be left to cure and thus harden. Various approaches such as thermal and chemical may be used to speed up the curing process. For example, a torch, hot air blower, or microwave energy may be attached to the nozzle assembly 301 (not shown) to treat the extruded material and speed its curing. A judicious choice of material may also be made for the rims, that cures quickly, such as plastic.

As shown in FIG. 4(b) another rim layer may be extruded on top of the rim layer that has hardened. This may consist of a second exterior rim 413 being extruded on top of the first exterior rim 405 and a second interior rim 415 being extruded on top of the first interior rim 407. A first filler layer 411 may also be extruded between the first rim layers 405 and 407 by extruding material from the central nozzle 307 at the same time that the second rim layers 413 and 415 are being extruded. The filler may be of a much stronger material, such as cement. The filler material may or may not dry as quickly as rim material.

If the rim layers are able to cure quickly enough, and if their length is long enough, the nozzle assembly 301 may be able to return to the beginning of a pass to extrude the next layer of rims on top of the previous layer as soon as extrusion of the previous layer is complete. If the curing is fast enough, the nozzle assembly may instead be directed to extrude its next layers of material during the return traverse. Other sequences could also be followed, including a rest between traverses.

The process may be repeated until the height of the wall 403 reaches the needed level. FIG. 4(*c*) illustrates the wall 403 with six layers. After the last needed rim layers are extruded, the next pass may extrude only a filler layer, thus completing the wall structure.

Delaying the extrusion of filler layers helps insure that the rim layers will be strong enough to contain their neighboring filler layers. Of course, the extrusion of each filler layer need not always or even ever be exactly one traverse behind the extrusion of each neighboring rim layer. In other embodiments, the filler layers might be two or more layers behind the neighboring rim layers. Indeed, none of the filler layers might be extruded until after all or at least several of the rim layers have been extruded and hardened. In this embodiment, the entire wall filler or at least a large portion of it could be extruded in a single pass.

Figure 5:
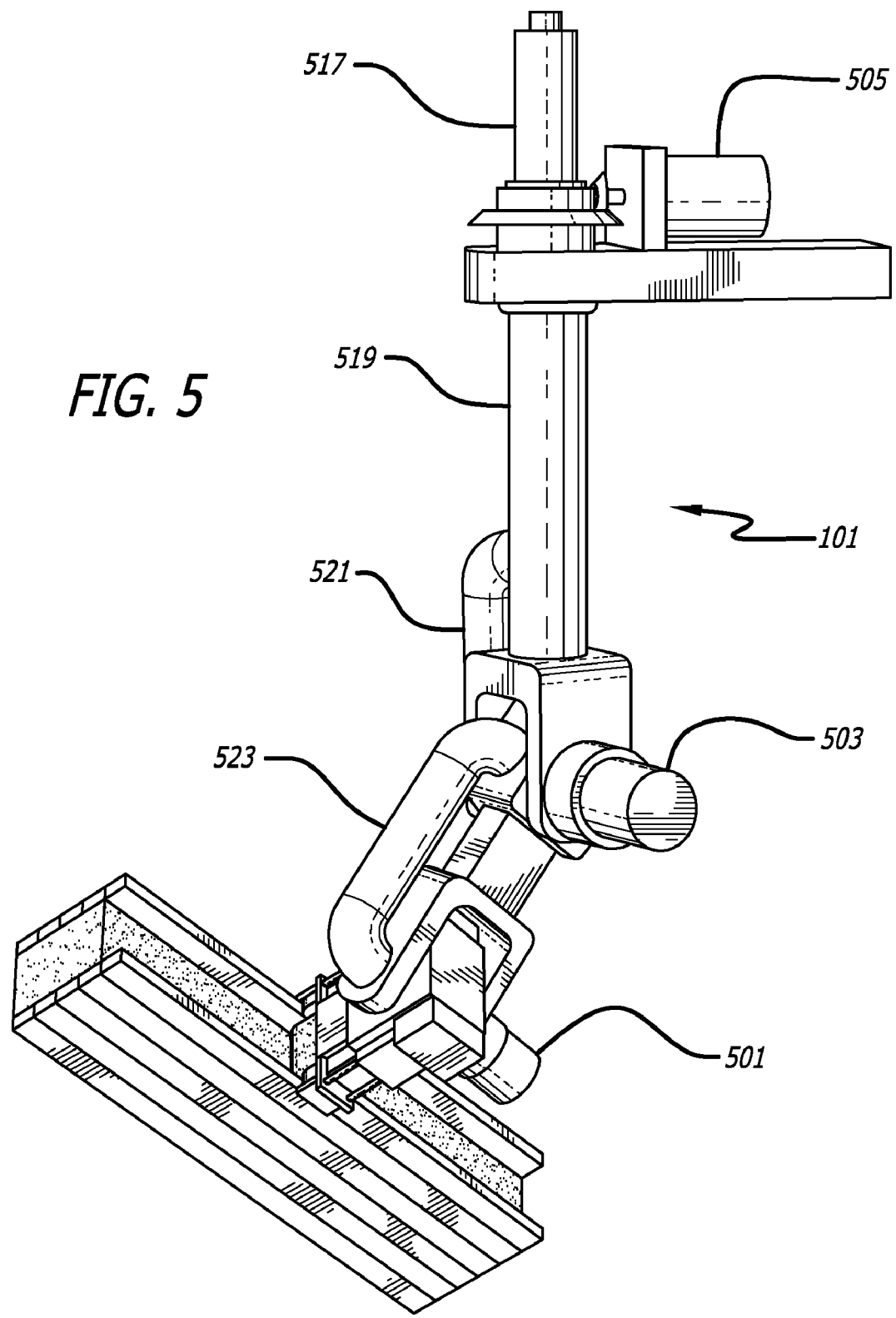
FIG. 5 illustrates the embodiment of the nozzle assembly shown in FIG. 3 being used to extrude a wall in an angled orientation.

FIG. 5 illustrates the embodiment of the nozzle assembly shown in FIG. 3 being used to extrude a wall at an angled orientation.

Material to be extruded may be delivered through outer tubes 517, 519, 521 and 523. Each of these outer tubes may contain within them a set of inner tubes, one channeling material to the exterior outlet 309 (see FIG. 3) and the interior outlet 311 (see FIG. 3), while the other channeling material to the central outlet 313 (see FIG. 3). In this way, the type of material that is delivered to the exterior outlet 309 and the interior outlet 311 may be different from the material that is delivered to the central outlet 313.

In another embodiment, each outer tube 517, 519, 521 and 523 may include three interior tubes, allowing a different type of material to be delivered to the exterior outlet 309 and the interior outlet 311 as well.

As also shown in FIG. 5 (and partially in FIG. 3), the nozzle assembly 101 may include an orientation control mechanism that can cause the outlets 309, 311 and 313 to be pointed in almost any direction. Any type of control mechanism may be used, including a control mechanism that is capable of orienting the outlets in one, two or three degrees of freedom. With respect to the nozzle assembly 101 shown in the figures, an orientation control mechanism has been selected that allows the outlets to be oriented in three dimensions. The orientation control mechanism may include servo motors 501, 503 and 505, each controlling a separate axis of orientation. Of course, appropriate internal structures may be included to translate the motion of these servo motors into the necessary movement. In certain embodiments, positioning information may be sent back to a servo controller (not shown) and used in one or more feedback loops to maximize the accuracy of the positioning that is obtained. Appropriate material channeling chambers and gaskets may also be included (not shown) to ensure that the material continues to flow without significant leakage in the moving joints, regardless of the angular orientation that is directed. The nozzle assembly may itself be moved around by a XYZ positioning system, thus providing 6 degrees of freedom to the nozzle head.

Although nozzle assemblies having only a single or three nozzles have thus-far been illustrated, it is to be understood that a different number of nozzles could be used, depending upon the application, such as two, four or even more.

Figure 6:
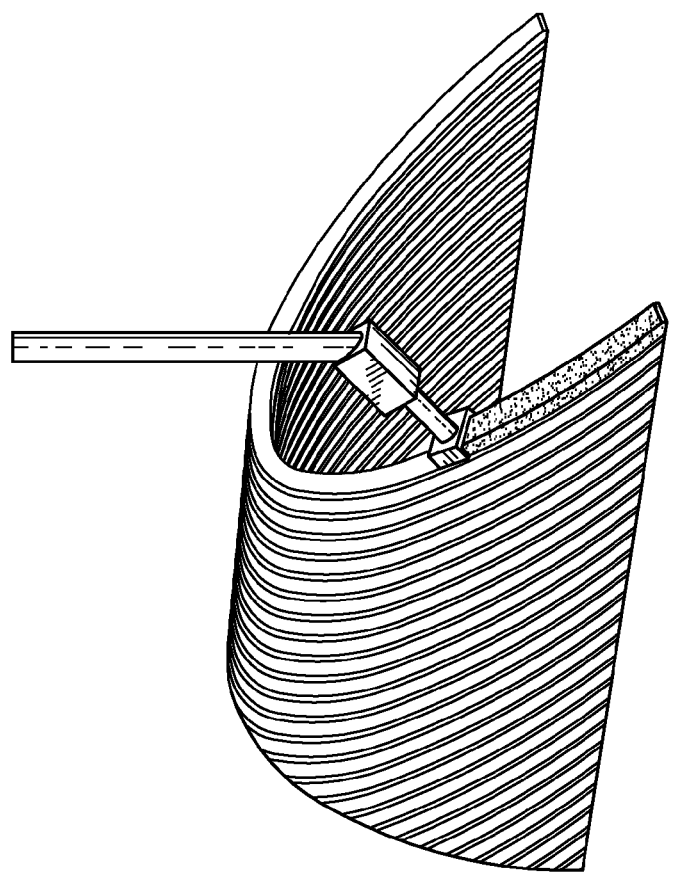
FIG. 6 illustrates a nozzle assembly having an orientation control mechanism being used to construct an embodiment of a supportless roof.
Figure 7:
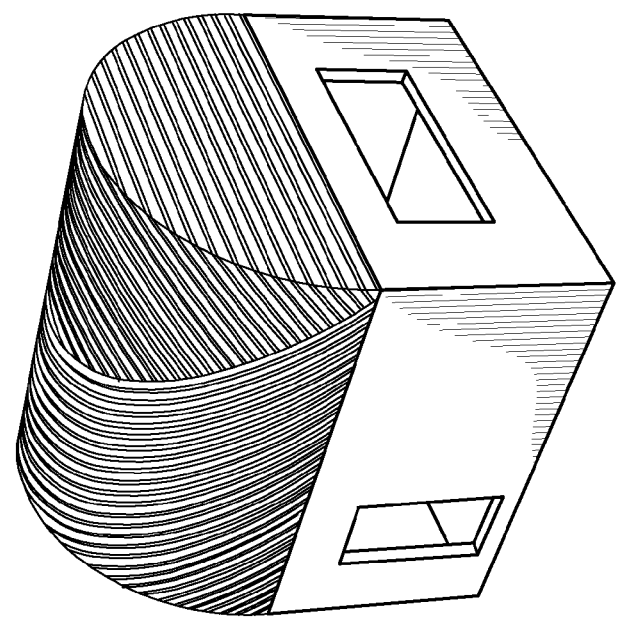
FIG. 7 illustrates the supportless roof shown in FIG. 6 in its completed state atop a wall structure.

FIG. 6 illustrates a nozzle assembly having an orientation control mechanism being used to construct an embodiment of a supportless roof. FIG. 7 illustrates the supportless roof shown in FIG. 6 in its completed state atop a wall structure. Collectively, these figures demonstrate how the positional flexibility of the nozzle assembly can facilitate the construction of supportless roofs, such as vaults. Although a nozzle assembly having only a single nozzle is illustrated, it is to be understood that a different number of nozzles could be used, such as the triple nozzle assembly shown in FIGS. 3-5.

Figure 8:
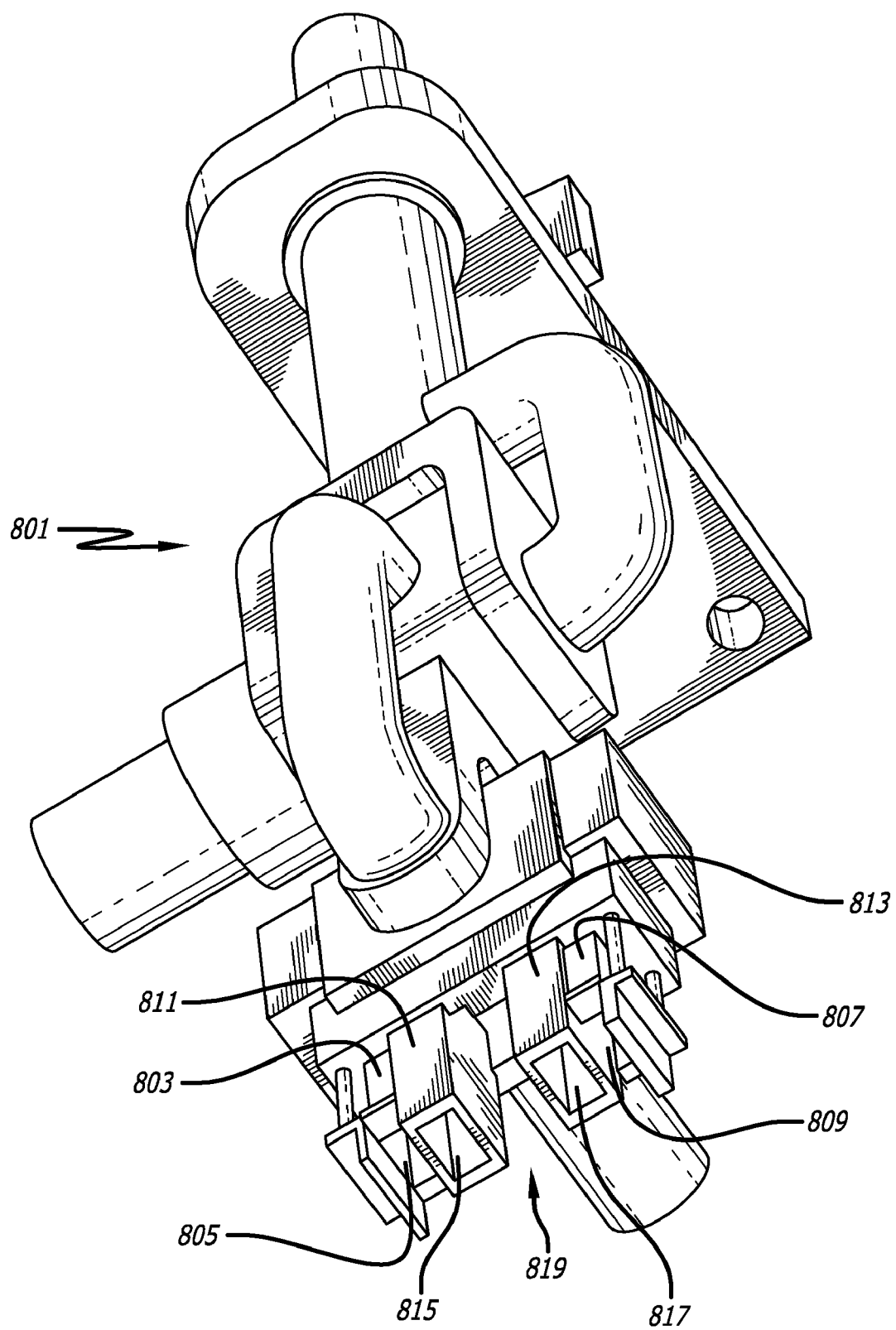
FIG. 8 illustrates another embodiment of a nozzle assembly that includes a slot in a central nozzle that accommodates reinforcement members.
Figure 9:
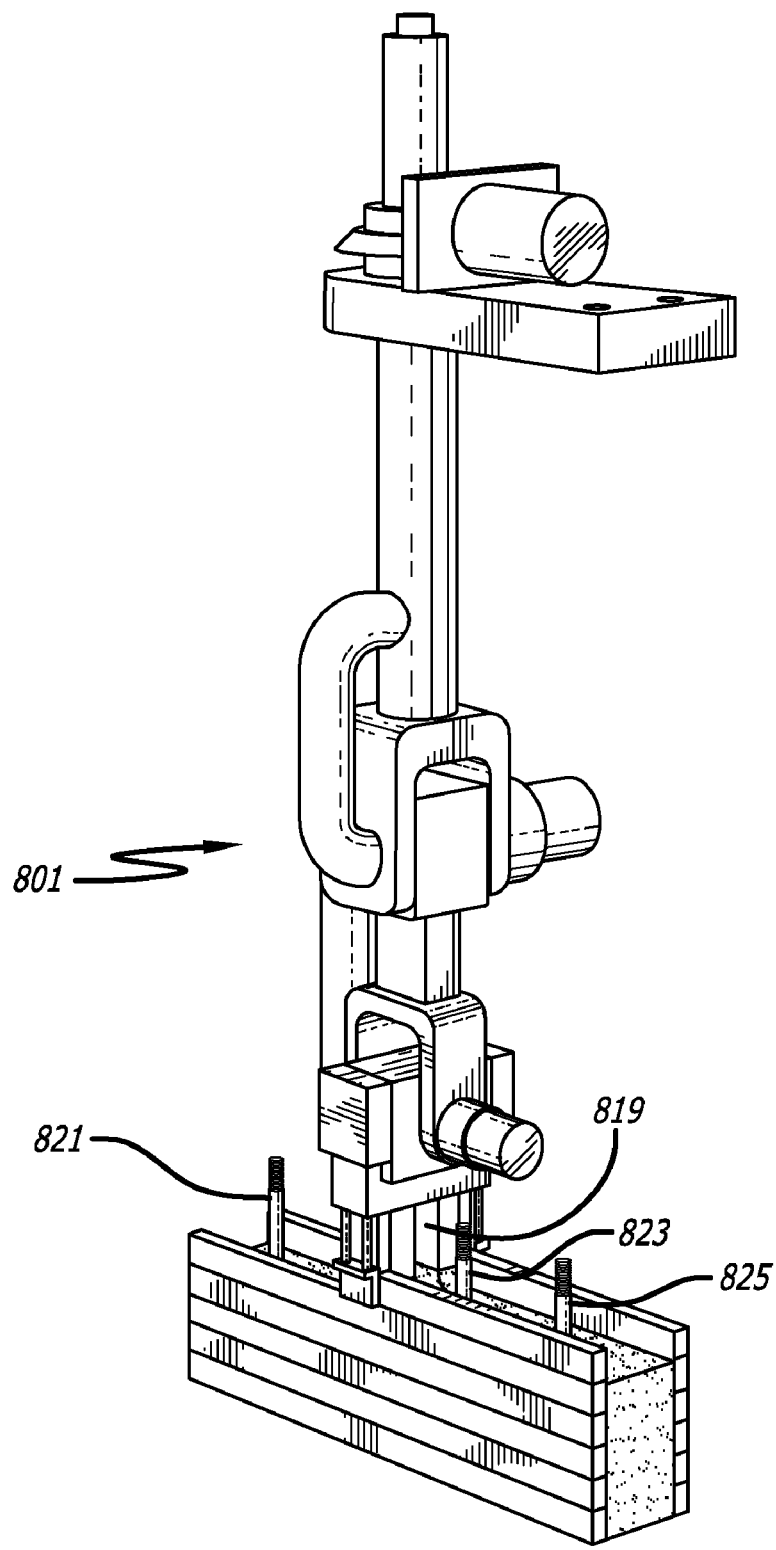
FIG. 9 illustrates the nozzle assembly shown in FIG. 8 being used to construct a wall having reinforcement members.

FIG. 8 illustrates another embodiment of a nozzle assembly that includes a slot in a central nozzle that accommodates reinforcement members. FIG. 9 illustrates the nozzle assembly shown in FIG. 8 being used to construct a wall having reinforcement members.

As shown in FIG. 8, a nozzle assembly 801 includes an exterior nozzle 803 having an outlet 805, an interior nozzle 807 having an outlet 809 and a central nozzle set consisting of two nozzles 811 and 813 having outlets 815 and 817, respectively, that are separated by an opening 819. FIG. 9 illustrates how the opening 819 ensures that the nozzle assembly 801 does not collide with reinforcing members 821, 823 or 825 during operation.

Figure 10:
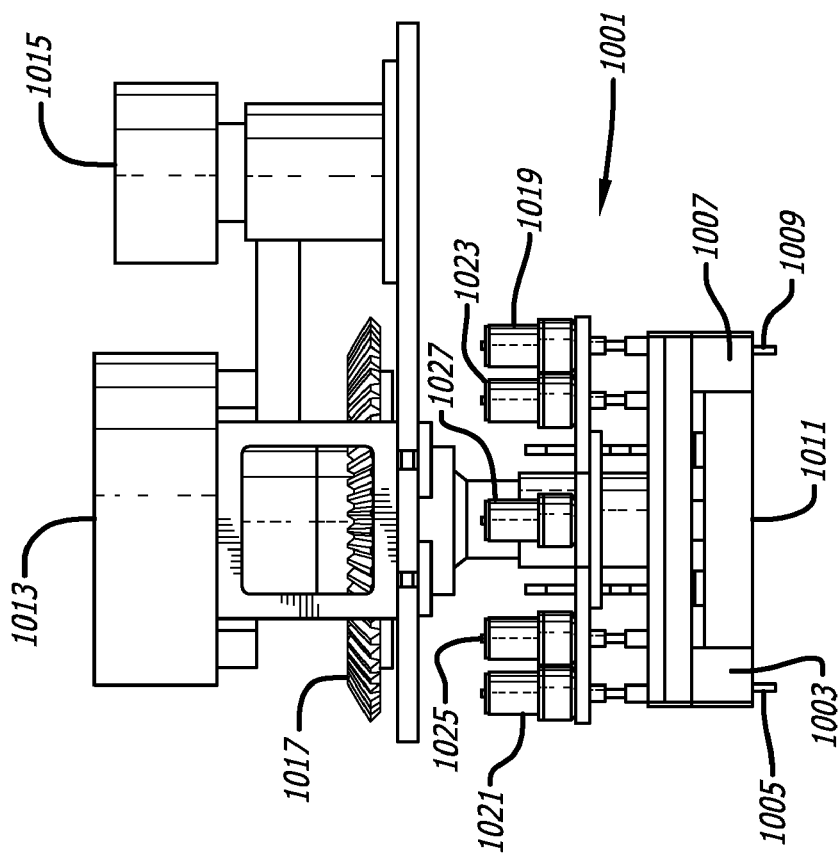
FIG. 10 illustrates another embodiment of a nozzle assembly.

FIG. 10 illustrates another embodiment of a nozzle assembly. As shown in FIG. 10, a nozzle assembly 1001 may include an exterior nozzle 1003 and an associated trowel 1005, an interior nozzle 1007 and an associated trowel 1009, and a central nozzle 1011. An inlet 1013 may be provided to receive material that is channeled to the central nozzle 1011 for extrusion, while an inlet 1015 may be provided to receive material that is channeled to the exterior nozzle 1003 and to the interior nozzle 1007 for extrusion. A bevel gear 1017 may be provided to rotate the nozzles.

Servo motors 1019 and 1021 may be used to control the height of the trowels 1009 and 1005, respectively. A servo motor 1025 may be used to control an internal gate valve (not shown) that is used to regulate the flow of material to the exterior nozzle 1003. Similarly, a servo motor 1023 may be used to control an internal gate valve (not shown) that is used to regulate the flow of material to the interior nozzle 1007. The flow of material to the central nozzle 1011 may also be regulated in a similar or different manner.

When making a curved wall, the rim material delivery rate may be different for the exterior and interior outlets. This may be effectuated by appropriate settings of the servo motors 1023 and 1025. The valve may be near or away from the nozzle. The gate valves may be configured to controllably adjust the volume of flow, as well as to completely cut the flow off.

A servo motor 1027 may be used to control the height of the central nozzle 1011 with respect to the external nozzle 1003 and the internal nozzle 1007. The heights of the external and/or internal nozzles may also be controlled in a similar or different manner.

Figure 11:
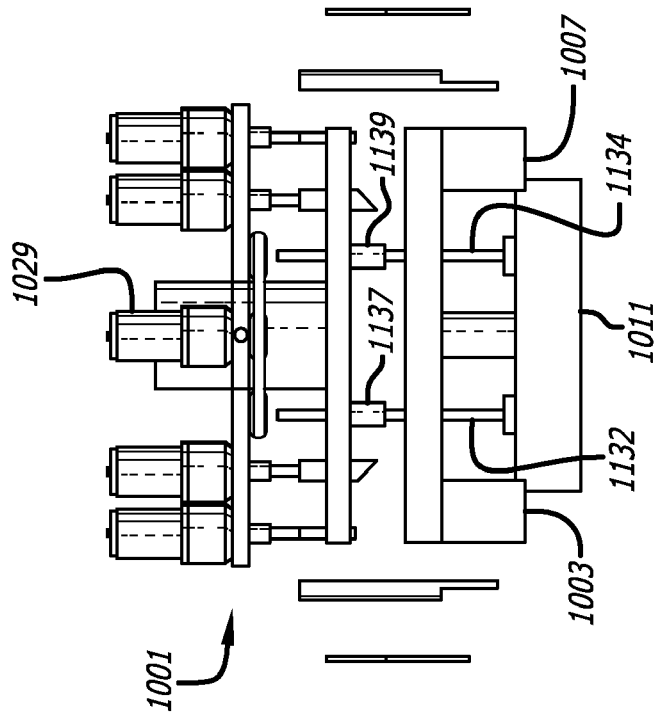
FIG. 11 illustrates certain components of the nozzle assembly shown in FIG. 10 in an unassembled form having a central nozzle at a height lower than interior and exterior nozzles.

FIG. 11 illustrates certain components of the nozzle assembly shown in FIG. 10 in an unassembled form with the central nozzle 1011 at a height lower than the interior nozzle 1007 and the exterior nozzle 1003. Such a height differential may be useful in embodiments in which each central filler layer is extruded one pass behind each surrounding rim layer. The ability to control the relative heights of the nozzles may also be useful in applications in which there is a need to avoid occasional obstructions.

FIG. 12 illustrates a bottom view of a portion of the nozzle assembly 1001 shown in FIG. 10. It provides more detail on how the servo motor 1029 may control the height of the central nozzle 1011 with respect to the exterior nozzle 1003 and the interior nozzle 1007. This detail includes a drive belt 1031 that causes ball screws 1132 and 1134 (see FIG. 11) to rotate and to thus cause a corresponding change in the elevation of the central nozzle 1011 due to interaction with associated threaded sleeves 1137 and 1139 (FIG. 11), respectively.

FIG. 13 illustrates an embodiment of a nozzle including a controllable front and rear gate. As shown in FIG. 13, a nozzle 1301 includes a controllable front gate 1303 and a controllable rear gate 1305. The controllable gate 1303 may be controlled by a gate controller, such as a servo motor 1307 and an associated coupling 1309. Similarly, the controllable gate 1305 may be controlled by a gate control mechanism, such as a servo motor 1311 and an associated control mechanism 1315.

Figure 14:
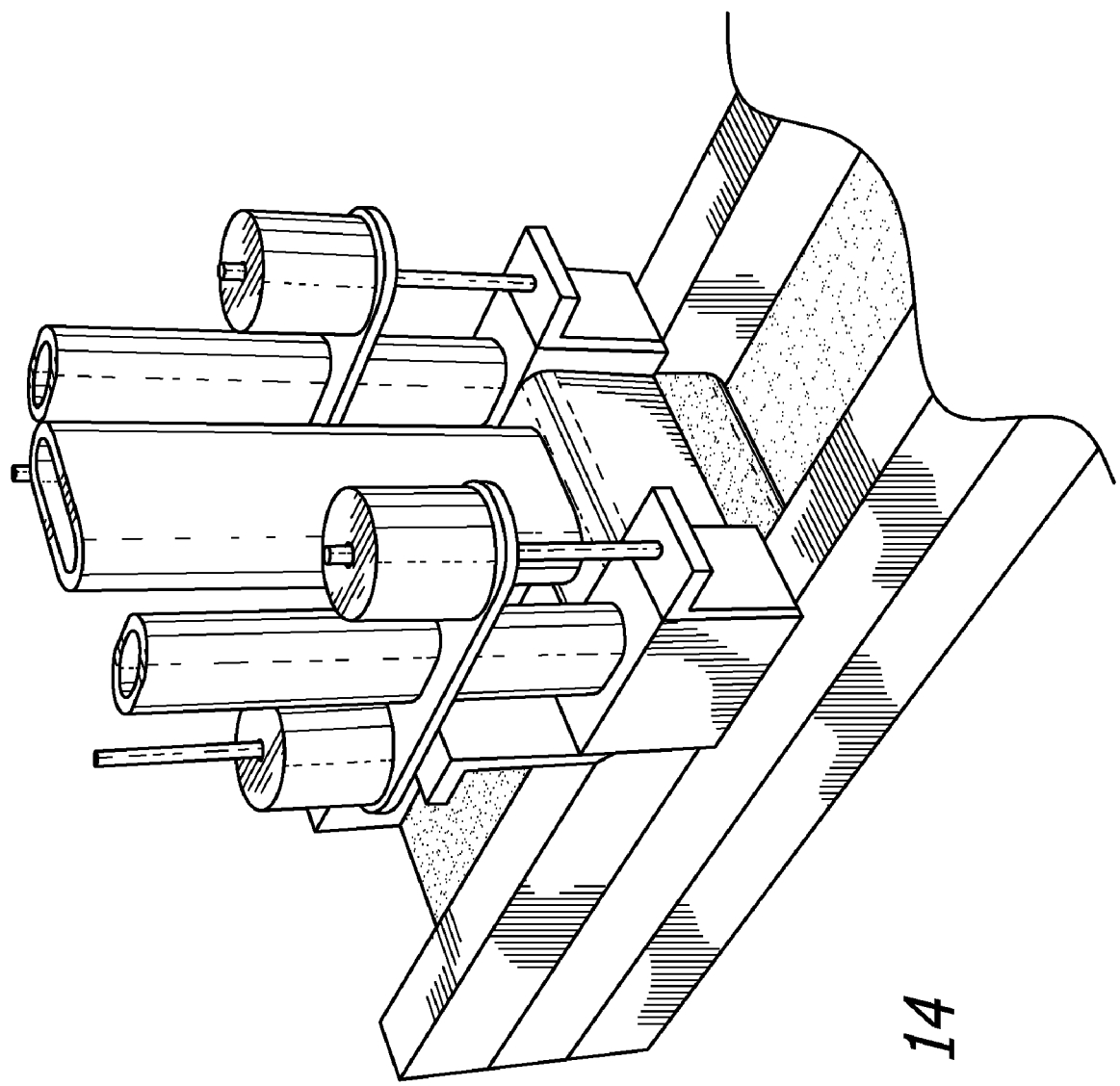
FIG. 14 illustrates one embodiment of a nozzle assembly using the type of nozzle shown in FIG. 13 being used to extrude a wall.

FIG. 14 illustrates one embodiment of a nozzle assembly with the nozzle shown in FIG. 13 being used to extrude a wall. This embodiment allows the beginning and end of each extruded layer to be shaped with a sharp vertical surface by appropriate control of the gates.

FIG. 15 illustrates the nozzle shown in FIG. 13 being used to extrude an insulation layer. In this embodiment, a polystyrene filament may be fed through an electrically heated barrel 1501 so that molten plastic comes out through a nozzle 1503. Compressed air may be mixed in as well to cause a bead of Styrofoam 1505 to be created. One or more of these layers may serve as insulation. Other types of polymers or other materials may be used instead.

FIG. 16 illustrates a nozzle assembly using the nozzle shown in FIG. 13 to extrude a wall with insulation. As shown in FIG. 16, a wall 1601 is being extruded by a nozzle assembly 1603 (shown only in part) that includes a stacked set of Styrofoam layers 1605, 1607 and 1609.

FIG. 17 illustrates another embodiment of a nozzle assembly having slots in a gate being used to extrude a wall with interlocked layers. As shown in FIG. 17, a gate 1701 includes slots 1703 and 1705 that cause corresponding ribs 1707 and 1709 to be created during the extrusion of the layer 1711. These create interlocking ribs, such as the interlocking ribs 1713, 1715 and 1717, thus strengthening the wall that is extruded.

Figure 18B:
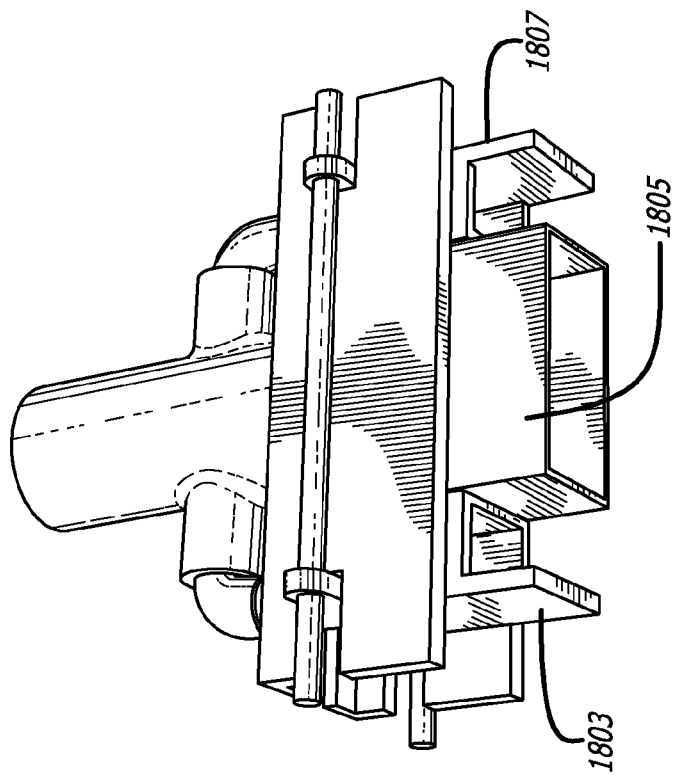
FIGS. 18A and 18B illustrate another embodiment of a nozzle assembly having variable width nozzles.
Figure 18A:
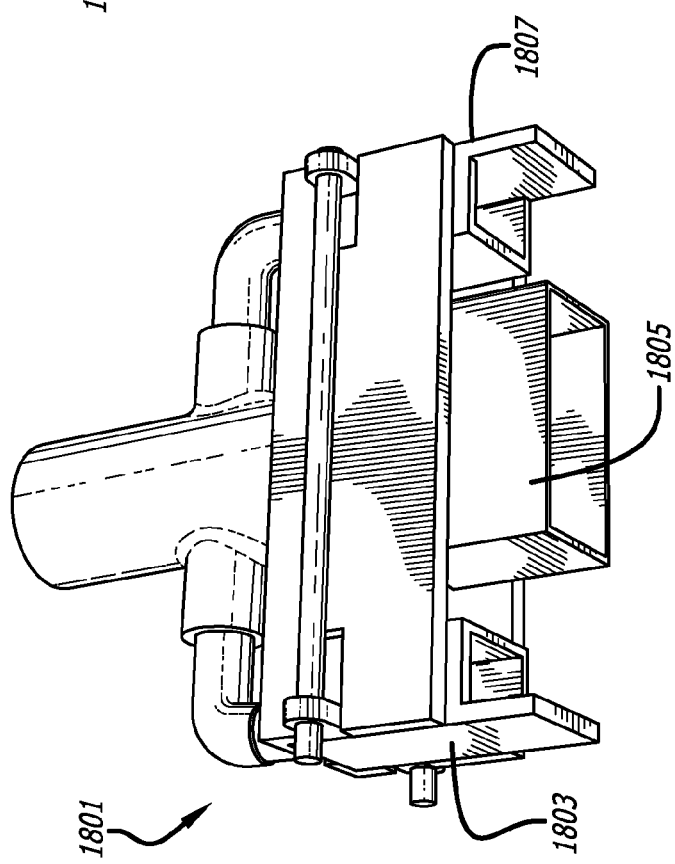

FIGS. 18 (a) and (b) illustrate another embodiment of a nozzle assembly having variable width nozzles. As shown in FIGS. 18(a) and (b), a nozzle assembly 1801 includes an exterior nozzle 1803, a central nozzle 1805 and an interior nozzle 1807. The width of the layer that is extruded from the exterior and interior nozzles 1803 and 1807, respectively, may be varied by adjusting the relative separation of these nozzles, either manually or automatically under servo control. FIG. 8(a) illustrates the exterior and interior nozzles being widely separated for a wider rim layer, while FIG. 8(b) illustrates these same nozzles being compressed together for a narrower rim layer. The flow rate of the extruded material may be reduced during a wider setting to insure that a full layer is extruded. The separating distance between the two rim nozzles may be varied during the extrusion of a structure to facilitate the construction of structures such as domes with a progressively thinning wall or to make certain walls, such as interior walls, thinner than other walls, such as exterior walls. Appropriate adjustments could also be made to make one rim layer thinner than the other.

Sensors (not shown) may be inserted within a structure being constructed, to provide feedback regarding construction performance. After the structure is completed, these sensors may continue to be used to report on information about the structure, such as heat, humidity, and deformation.

In one embodiment of a nozzle assembly, the nozzle assembly may include a roller that follows the extrusion and creates textures on the walls of the layers that are extruded.

A broad variety of construction applications may advantageously utilize one or more of the nozzle assemblies that have now been described.

For example, a nozzle assembly may be attached to an arm of a robotic system. Under computer or other control, the nozzle assembly may extrude the walls of an entire building, including several rooms. A gantry system may be used to support and position the nozzle assembly as it traverses the needed paths. A positioning system may also be used to accurately position the nozzle assembly, such as a system that includes fixed reference points and a laser rangefinder mounted on the nozzle assembly.

Figure 19:
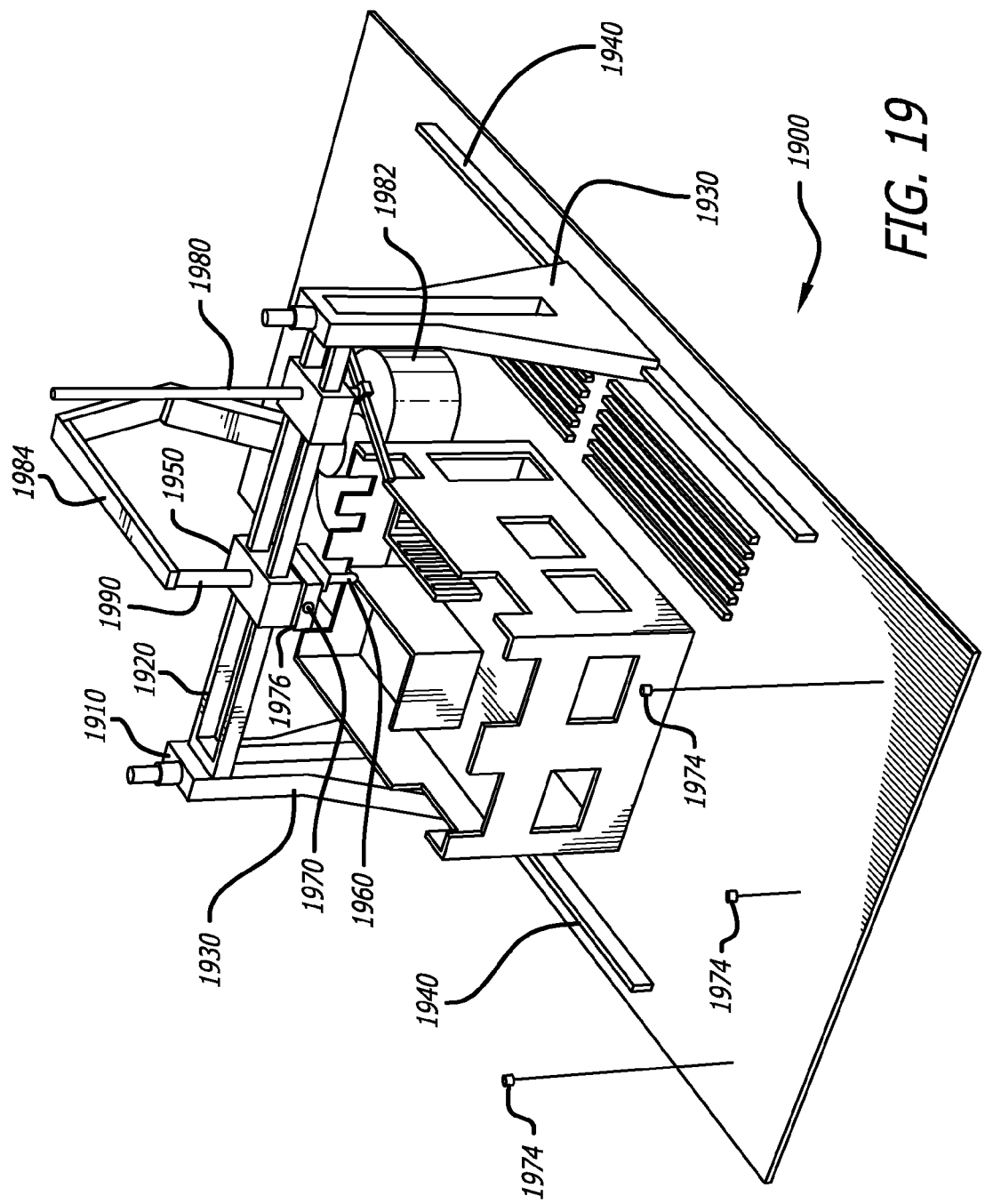
FIG. 19 illustrates one embodiment of a robotic system that includes a movable gantry robot to control the position of the nozzle assembly.

FIG. 19 illustrates one embodiment of such a robotic system that includes a movable gantry robot to control the position of the nozzle assembly. As shown in FIG. 19, a robotic system 1900 may include a movable gantry robot 1910 slidably mounted on a pair of rails 1940, and having a movable gantry platform 1950 to which a nozzle assembly 1960 is attached. The movable gantry robot 1910 may have an overhead beam 1920 that is supported by, and extends between, at least two side members 1930 that are slidably mounted on the pair of rails 1940. The movable gantry platform 1950 may be slidably mounted to the overhead beam 1920, and the nozzle assembly 1960 (shown only partially in FIG. 19) may be attached to the gantry platform 1950 in such a way that the nozzles assembly follows the motion of the gantry platform 1950.

The robotic system 1900 may include a position controller that controls the position and movement of the gantry robot 1910 along the rails, as well as the position and movement of the gantry platform 1950 and the nozzle assembly 1960. The position controller may include a position sensor 1970 that senses the position of the nozzle assembly, and an actuator 1972 that controllably moves the nozzle assembly to a desired position, in response to the output of the position sensor 1970. The position sensor 1970 may be a laser rangefinder 1970, for example, illustrated schematically in FIG. 19, although any other position detection device known in the art may be used. Three reflectors 1974 installed on fixed poles installed at the construction site may provide fixed reference points for the laser rangefinder 1970.

The laser rangefinder 1970 (also called a lidar or a laser tracker) may be a laser device that can accurately measure the distance to an object by sending out light to the object and analyzing the light that is reflected/scattered off of the object. The range to the object may be determined by measuring the time for the light to reach the object and return. The laser rangefinder 1970 may include: 1) a transmitter (not shown) that generates laser light and transmits the laser light toward the reflectors 1974; 2) a receiver (not shown) configured to receive the transmitted light that is back-scattered from retroreflectors 1974 at the reference points; 3) a photodetector (not shown) configured to detect the intensity of the light received by the receiver; and 4) a data acquisition system (not shown), effective to compute the distance to the object by making time-of-flight measurements, i.e. by measuring the time required for the light to reach the object and return.

A material feed system 1980 that is configured to feed material to the nozzle assembly 1960 may be coupled to the gantry robot 1910. The material feed system 1980 may include a container 1982 configured to store material, and an articulated feeding tube 1984 configured to feed material stored in the container 1982 to the nozzle. The material may pumped in a premixed form by the ground based articulated delivery arm 1984, by analogy to conventional concrete pump systems. In the latter case, the articulated delivery arm 1984 may be passive, in which case it may be rigidly attached to the gantry platform, i.e. the connecting member 1990 between the delivery arm 1984 and the gantry platform may be rigid. In this configuration, the gantry robot delivers the necessary force to move the feeding tube. An excessive opposing force may be exerted in this case, however, due to the inertia of the possibly high mass of the material feed system.

In an alternative arrangement, the material feed system may have its own active drive mechanism controllable by a joystick (not shown). In this embodiment of the robotic system, the gantry robot may activate the joystick, and the material feed system may follow the gantry robot. In this master/slave control setting, the material delivery arm should not be rigidly connected to the gantry robot, because the delays and imprecision involved in positioning would necessitate a flexible connection 1990 between the gantry robot and the material delivery arm, to compensate for the positioning lags and errors.

Due to large size and potentially high weight of the members of the robotic system 1900, as well as the acceleration/deceleration in motions, a considerable flexing may occur in the gantry robot. It may thus be difficult to maintain an accurate position for the nozzle assembly. To correct for such flexing and other positioning errors of the nozzle assembly, a second adaptive platform 1976 with a highly responsive servo system may be attached to the gantry platform 1950.

Figure 20:
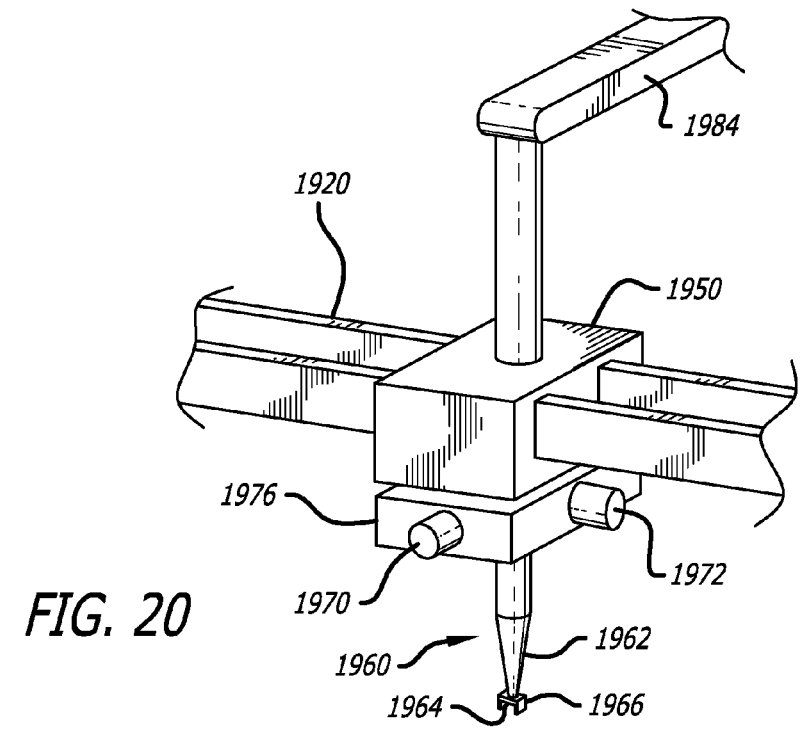
FIG. 20 illustrates a movable gantry platform, an adaptive platform, and a laser rangefinder included in the movable gantry robot shown in FIG. 19.

FIG. 20 illustrates in more detail such an adaptive platform 1976 equipped with a laser rangefinder 1970 and attached to the movable gantry platform, in the gantry robot shown in FIG. 19. The adaptive platform 1976 may be equipped with a laser rangefinder 1970, or other position sensing devices such as devices using atomic clocks and electromagnetic waves. The laser rangefinder 1970 accurately senses the platform position using the three fixed reference points 1974 installed at the construction site. The nozzle assembly 1960 may be installed on the adaptive platform 1975. The nozzle assembly 1960 may include a nozzle 1962 configured to extrude material from an outlet 1964, and a trowel 1966 configured to shape material extruded from the nozzle 1962. As the gantry platform makes inaccurate moves, for example due to structural flexing, the adaptive platform (equipped with a laser rangefinder or other type of position detection device), accurately maintains the desired course using the three fixed reference points installed at the construction site. The possible range of the adaptive platform motion in any direction may be at least as large as the maximum aggregate flexing and positioning error of the gantry platform.

Figure 21A:
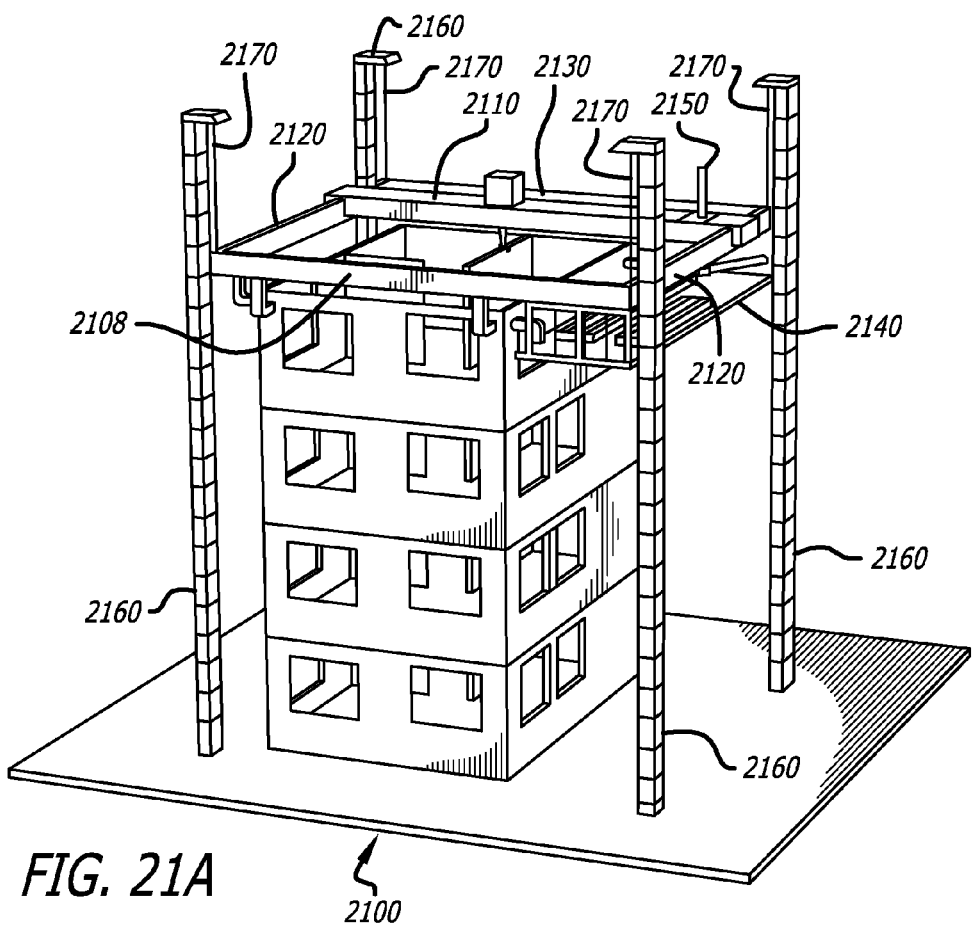
FIGS. 21A and 21B illustrate a perspective view and a top view, respectively, of one embodiment of a construction apparatus having a lifting mechanism to build high-rise structures.
Figure 21B:
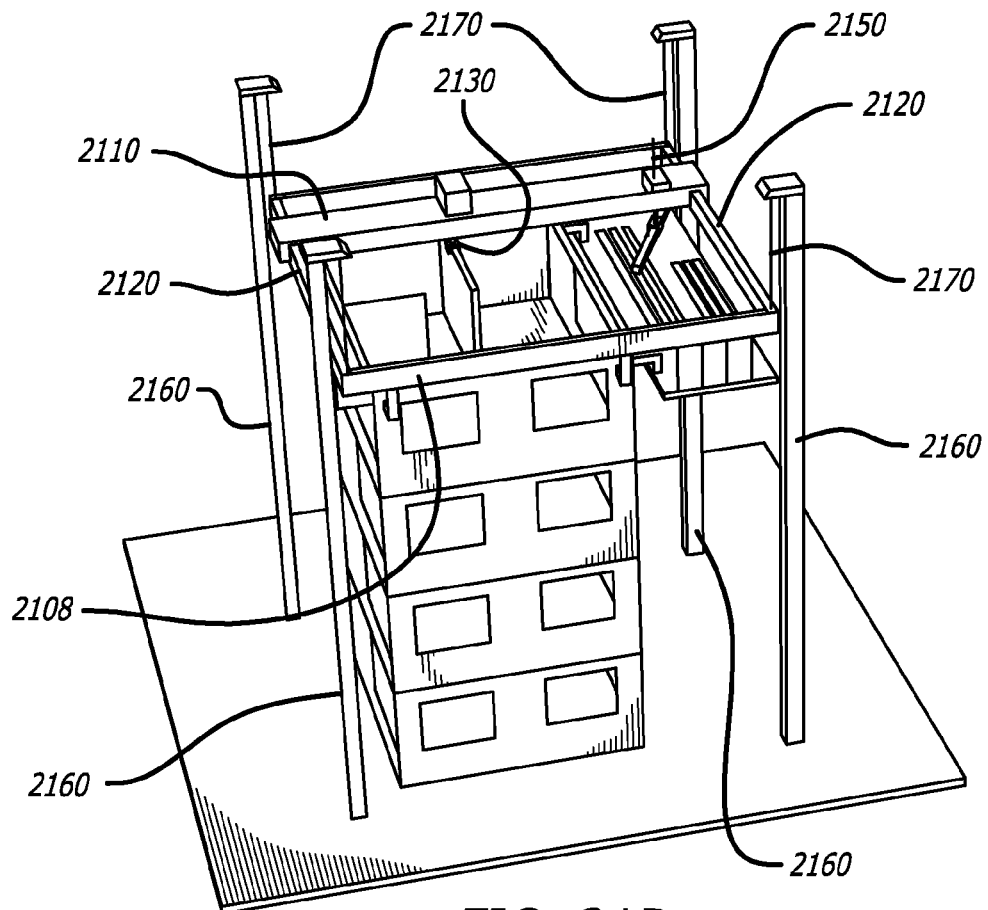

To build high-rise structures, a robotic system may use a lifting mechanism that controllably lifts the gantry platform to a desired height. FIGS. 21A and 21B illustrate a perspective view and a top view, respectively, of one embodiment of a construction apparatus 2100 having a lifting mechanism to build high-rise structures. In the embodiment illustrated in FIGS. 21A and 21B, several cranes 2160 that lift the gantry platform by means of cables 2170 may be used. The construction apparatus 2100 may include a movable gantry platform 2120 having a cross-member 2110 that is slidably mounted across a pair of opposite side-members 2120 and extends therebetween. The gantry platform may be supported by the cables 2170 extending from the cranes 2160.

The lifting mechanism may be configured to controllably lift the gantry platform to a height sufficient for the nozzle assembly 2130 to extrude a layer of material on top of a previously extruded layer of material. The cable lift mechanism, which may be performed successively after a specified number of layers are constructed, may perform coarse positioning in the vertical direction, by causing the cables to collectively hoist the gantry platform to a desired height. The nozzle assembly may have its own Z motion control for a limited range. The illustrated cable lift mechanism may lift the nozzle assembly layer by layer, and in constructing each layer the nozzle assembly may adaptively compensates for cable positioning inaccuracy.

The main gantry platform 2108 may have an extension platform 2140 that holds the material (concrete batch, beams, plumbing modules, etc.) and can be accessed by a robotic manipulator 2150 that rides on the same main platform 2108 and that is connected to the nozzle assembly 2130. Material on the main platform 2108 may be periodically replenished by means of elevators (not shown) or conventional construction cranes.

Figure 22:
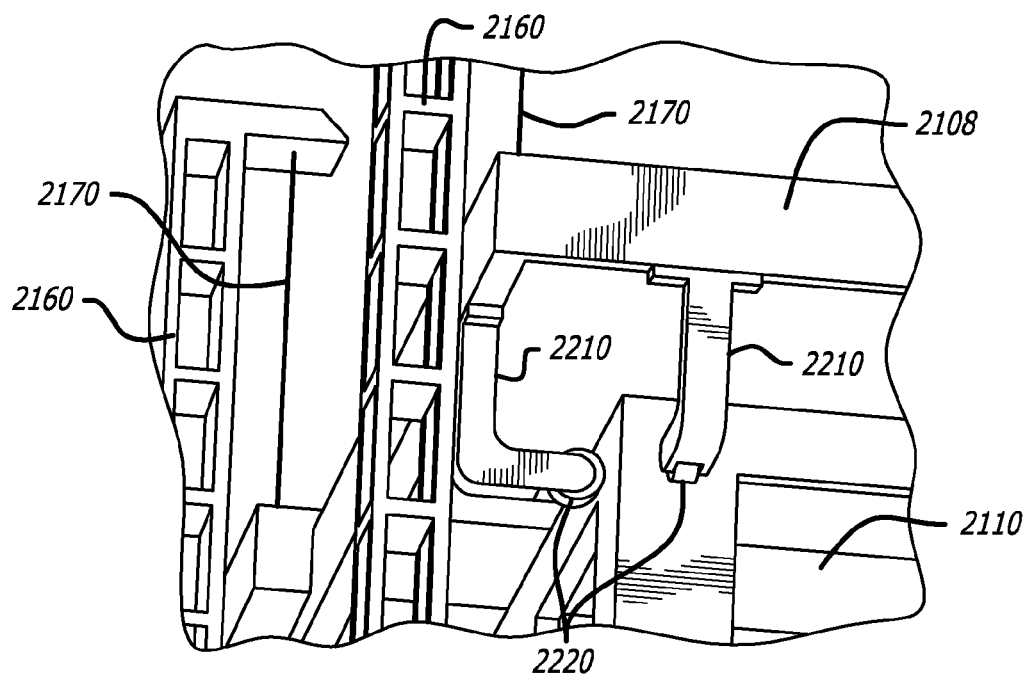
FIG. 22 illustrates one embodiment of anchoring elements that anchor the gantry platform shown in FIGS. 20 and 21A-21B to a rigid structure.

FIG. 22 illustrates the anchoring of the gantry platform 2108 shown in FIGS. 20 and 21A-21B to a rigid structure. As cables cannot deliver lateral stiffness, the body of the building structure, which is generally very rigid, may be used to anchor the gantry platform. This may be done by means of attachments that have accurate wheels that are tightly in touch with the well cured (several layers below the freshly deposited layers) building external wall surfaces. One or more attachment members 2210 may extend from points along the gantry platform. Each attachment member 2210 may have a wheel 2220 affixed thereto. The wheels 2220 may deliver lateral stiffness to the gantry platform when the wheels 2220 are tightly in touch with the external surfaces of the well cured building wall, several layers below the freshly deposited layers. An adaptive positioning system may be built into some of the attachment members 2210, in order to compensate for small possible dimensional errors, so that all wheels 2210 around the platform 2108 are kept in touch with the building structure.

In the beginning of the construction process, when there is no building structure to anchor against, the gantry platform 2108 may rigidly rest on the ground. The initial, lower section of the building may be constructed by means of elevating the nozzle by its own vertical motion control mechanism. When the highest limit of the motion control mechanism has been reached, the cable lifting system may be activated. By this time the constructed building section may provide stiff support to the suspended gantry frame, be means of wheeled attachments 2210 and 2220, described above.

Figure 23A:
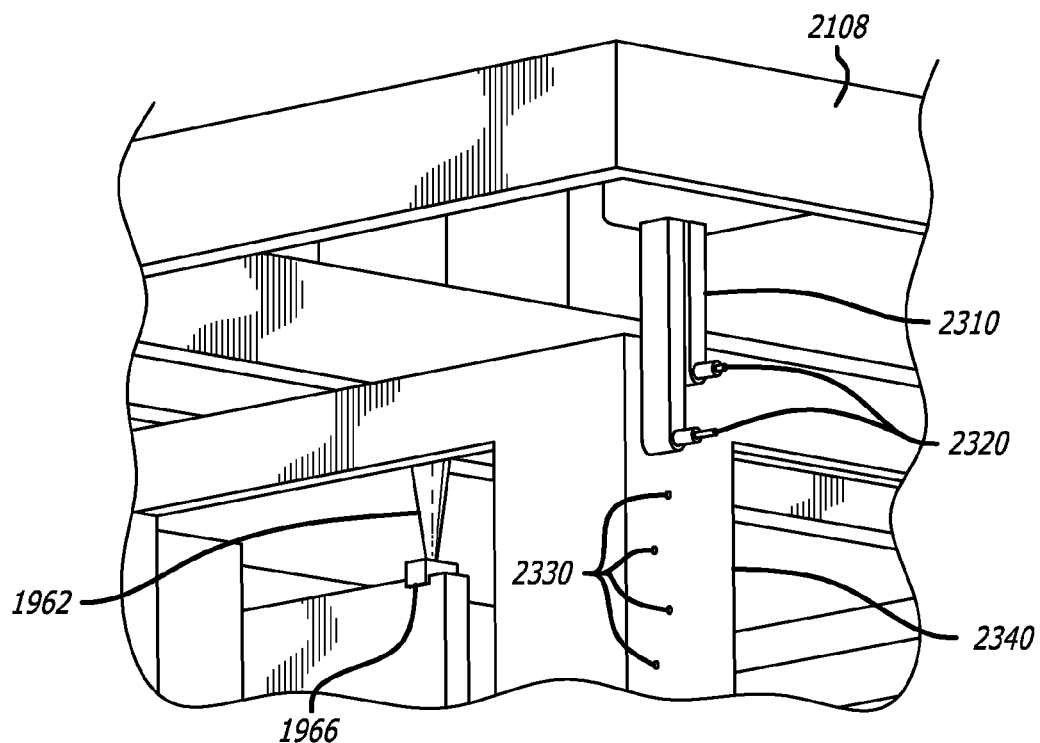
FIGS. 23A and 23B illustrate another embodiment of a lifting mechanism for the construction apparatus illustrated in FIGS. 21A and 21B.

FIG. 23A illustrates another embodiment of a lifting mechanism for the construction apparatus illustrated in FIGS. 21A and 21B. As seen in FIG. 23A, in this embodiment of a lifting mechanism, cable cranes are not used to lift the gantry platform, but rather the gantry platform may climb the building by means of vertically reciprocating legs 2310. Each leg 2310 may have a pin drive mechanism that can extend and retract conical headed pins 2320 into and out of metal tubing sections 2330. The metal tubing sections may be robotically embedded into the walls, upon layer wise construction. The pins 2320 may be spaced by a desired number of layers.

Figure 23B:
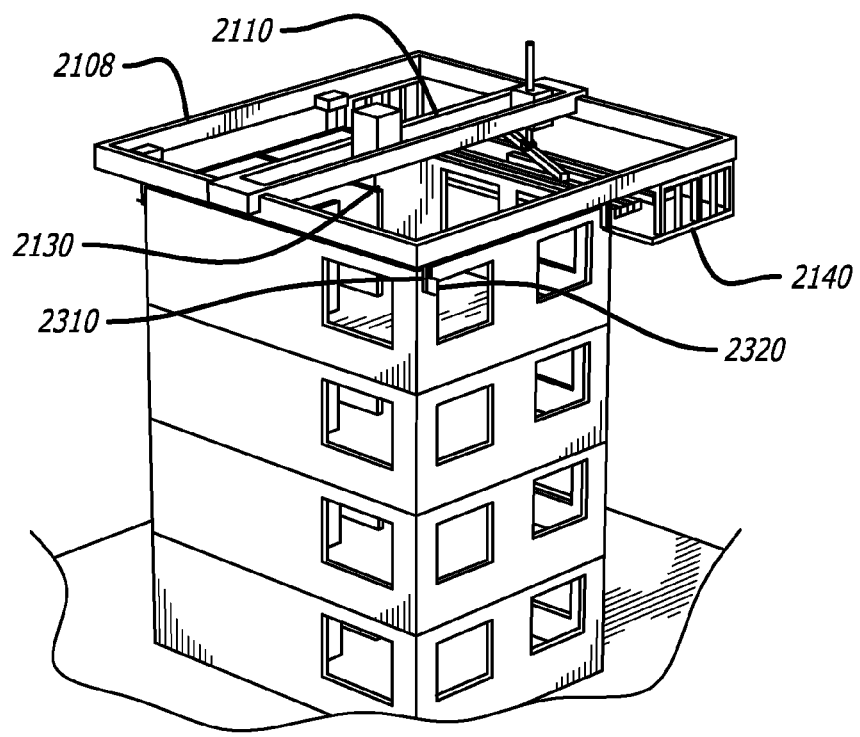

FIG. 23B illustrates the construction of several stories of a high-rise structure, using the lifting mechanism illustrated in FIG. 23A. As seen in FIG. 23A, this type of lifting mechanism requires minimal set up and is practically unlimited as to the height of the structure that it can build.

The support metal tubing sections, which may be visually unappealing on the constructed building, may be cosmetically covered by plastic plugs, or permanently plastered or cemented closed. Leaving the metal tubing sections 2330 reusable may facilitate other automated systems such as painting systems, window washing systems, and robotics emergency rescue systems. The frame lifting approach disclosed here thus has general applications and is not limited to construction of structures using extrusion by a nozzle assembly.

Figure 24:
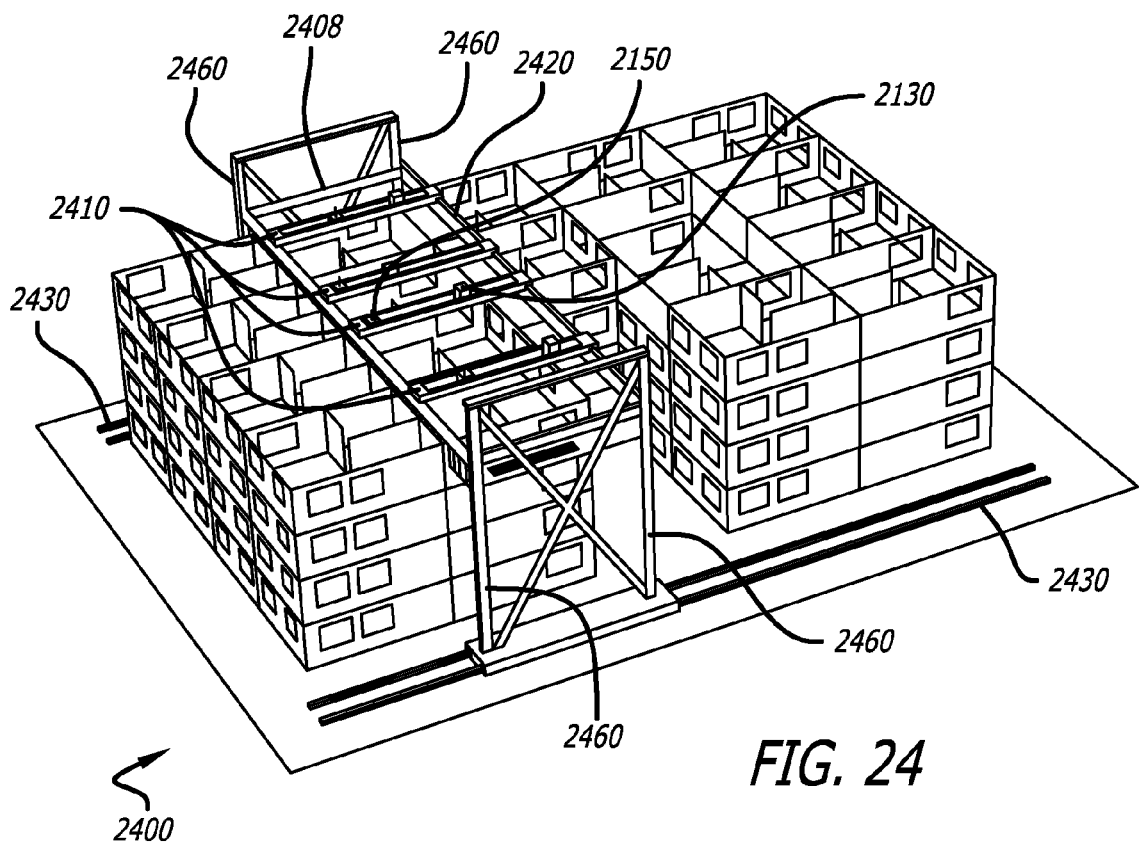
FIG. 24 illustrates another embodiment of a movable gantry robot including a plurality of cross-members that each holds a nozzle assembly.

In one embodiment of a robotic system, a plurality of nozzle assemblies may simultaneously be employed, instead of one large gantry system and a single nozzle assembly traversing the layers of the entire structure. FIG. 24 illustrates another embodiment of a construction apparatus 2400 having an overhead gantry platform 2408 that includes a plurality of cross-members 2410. To build large structures such as apartment buildings, hospitals, schools and government buildings, the overhead gantry platform 2408 may extend above the width of the large structures. Two sets of cranes 2460, each riding on rail tracks 2430 laid alongside the structure, may be used to lift the platform. The platform 2408 may be equipped with multiple cross members 2410, each holding a nozzle assembly 2130 and a robotic manipulator 2150 coupled to the nozzle assembly. Each cross member 2410 may be slidably mounted across a pair of opposite side-members 2420 (for beam installation, plumbing, etc.).

The side cranes 2460 may move infrequently, and stop at a selected positions while construction takes place at those positions. While the side cranes are stopped at a given position, and the gantry platform is held at the given position, all necessary construction under the platform may be performed, for several layers. The platform may then be moved by the side cranes 2460 to the next position, and the construction may be resumed. This cycle may be repeated until completion of the large-scale structure. For very large structures, multiple crane/gantry platform assemblies may be used concurrently.

Figure 25:
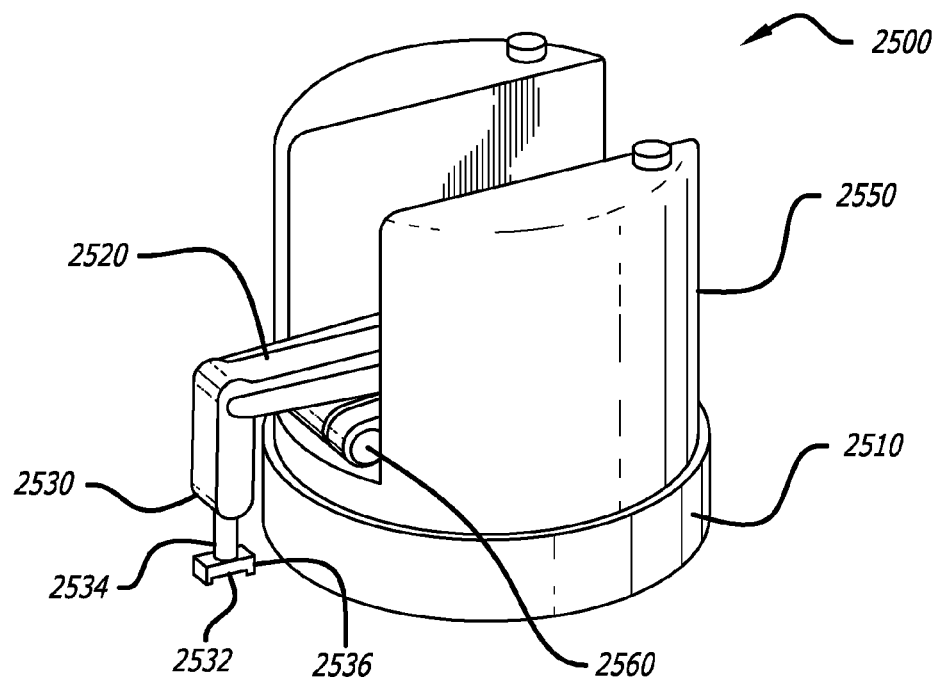
FIG. 25 illustrates one embodiment of a mobile robotic system.

In another embodiment of a robotic system, mobile robotics may be used. FIG. 25 illustrates one embodiment of a mobile robotic system 2500, having a movable robotic base 2510, and an articulated robotic arm 2520 extending from the robotic base 2510. The mobile robotic system 2500 may use a conventional joint structure, and be equipped with material storage containers and delivery pipes. A nozzle assembly 2530 may be coupled to the distal end or the end effector of the robotic arm 2520, and can be lifted by the robotic arm 2520 to a desired height above the robotic base 2510. The nozzle assembly 2530 can thus reach from the ground level all the way to the top of a wall. A material feeding system 2550 may be mounted on the robotic base 2510, and may be configured to feed material to the nozzle assembly 2530.

The nozzle assembly 2530 may include a nozzle 2534 configured to extrude material (received from the material feeding system 2550) through an outlet 2532, and a trowel 2536 configured to shape material extruded by the nozzle 2534. Because of the imprecision involved in positioning, an adaptive fine positioning platform equipped with a global sensing mechanism (e.g., a laser tracker) may be used for nozzle positioning.

If the robotic arm 2520 could be made of a rigid structure, position sensing at the end effector may not be necessary. Instead, a position sensor 2560 may be mounted on the robotic base 2510. The position sensor 2560 may be a laser tracker, for example. In this configuration, the mobile robot 2500 does not engage in construction while in motion. Once it reaches a desired predetermined post, it may anchor itself by extending solid rods (not shown) from the bottom of the mobile robot 200. Then the mobile robot 2500 may start the fabrication process, picking up from the last point of fabrication, while at the previous post.

Figure 26:
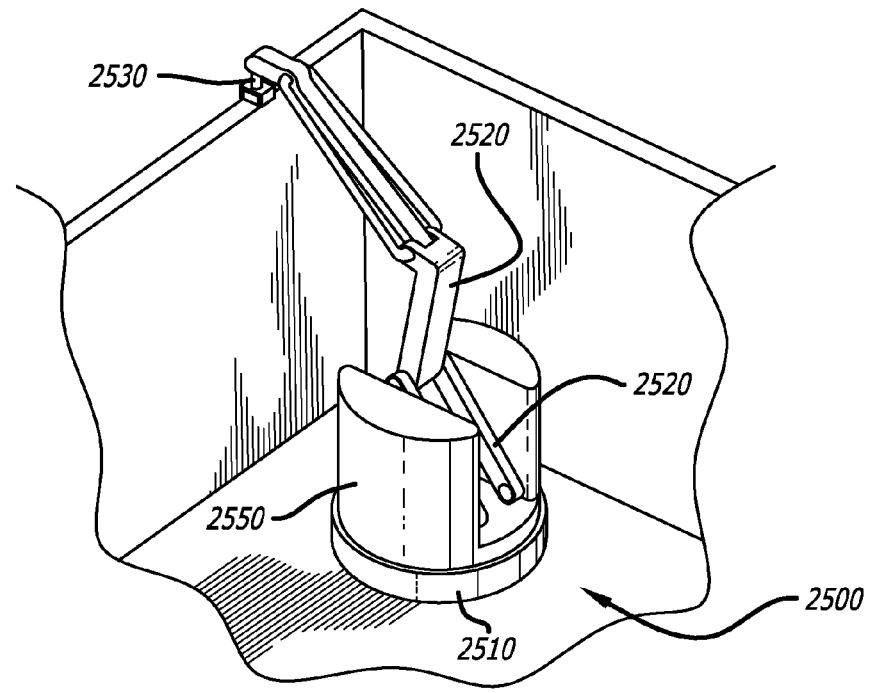
FIG. 26 illustrates the mobile robotic system shown in FIG. 25 being used to construct a wall.

FIG. 26 illustrates the mobile robotic system shown in FIG. 25 being used to construct a wall. In its upright position the mobile robot 2500 can reach the top of relatively high walls. The mobile robot 2500 may position itself at each of the four corners of a room, and each time build the layer section of the wall within its reach. The mobile robot 2500 may return to energy charging and material fill location, when needed.

Instead of using a single mobile robot that controls a single nozzle assembly, a plurality of nozzle assemblies may simultaneously be employed. Each may be attached and controlled by the arm of a small mobile robot dedicated to that nozzle assembly. The mobile robotics approach may have features such as ease of transportation and setup, scalability in terms of the number of robots deployed per project, and possibility of concurrent construction where multiple mobile robots work on various sections of the structure to be constructed.

Figure 27:
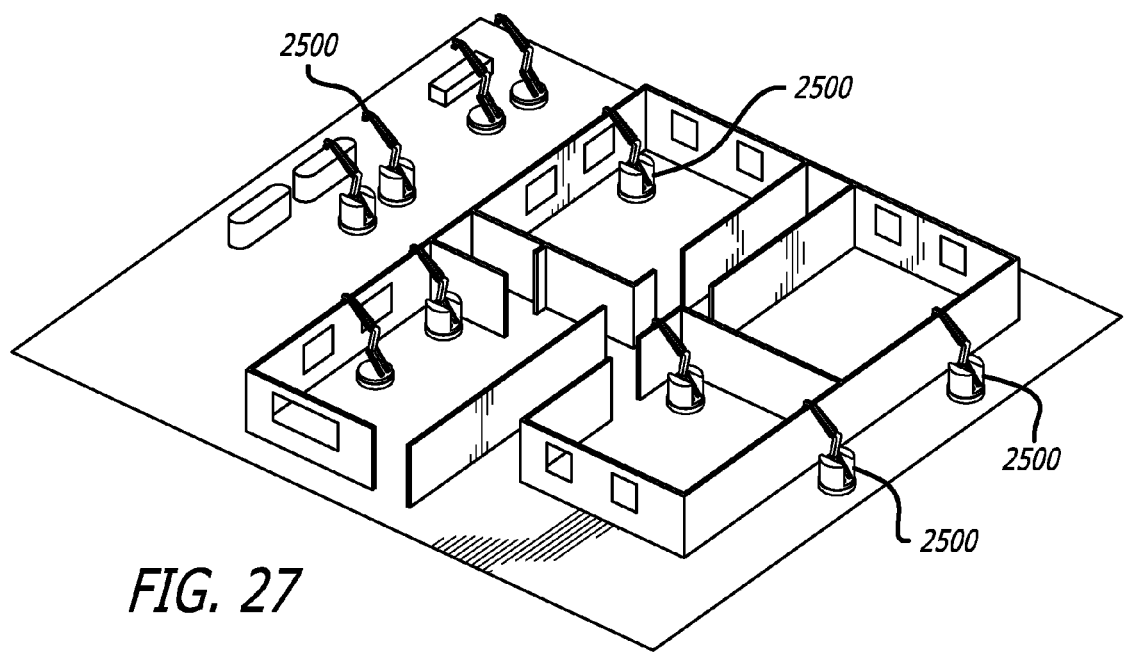
FIG. 27 illustrates a plurality of the mobile robotic systems, shown in FIG. 25, operated concurrently for construction.

FIG. 27 illustrates a plurality of the mobile robotic systems 2500, shown in FIG. 25, operated concurrently for construction. The position and actions of this workforce of mobile robots 2500 may be directed wirelessly by a central command station. As seen from FIG. 27, each one of these small robots, in turn, may include on-board material containers or tanks that contain the necessary materials that are extruded. These small mobile robots 2500 may return to a central filling station to refill their tanks when needed. In building a multi-story structure an elevator may be used to transport the mobile robots 2500 to various floors. The mobile robots 2500 may be assigned to perform different jobs, e.g. construction, plumbing, or tiling.

Figure 28:
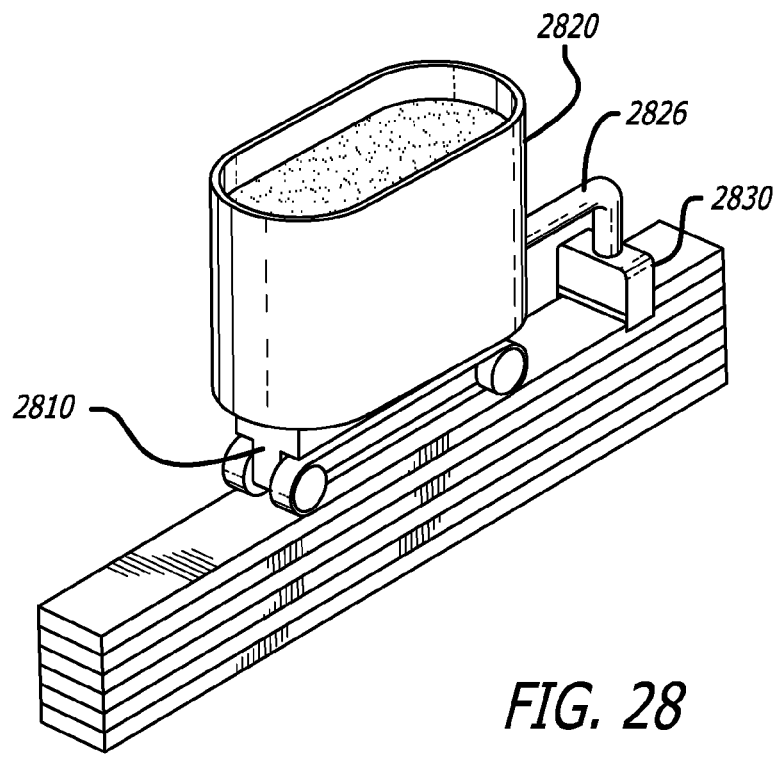
FIG. 28 illustrates another embodiment of a mobile robotic system that is equipped with a motorized wheel assembly.

In another embodiment of a robotic system, a mobile robotic system may be equipped with a motorized wheel assembly. FIG. 28 illustrates an embodiment of a mobile robotic system 2800 that is equipped with a motorized wheel assembly 2810. The mobile robotic system 2800 includes a nozzle assembly 2830 coupled to the motorized wheel assembly 2810, and a material feed system 2820 (including a container and a delivery arm) mounted on the motorized wheel assembly 2810 and configured to feed material to the nozzle assembly 2830. The material feed system 2820 may include a container 2822 and a feeding tube 2826.

The robotic system 2800 fills the container of the material feed system 2820 by stopping at one or more filling stations pre-installed at the construction site, adjacent to a wall to be constructed. The robotic system 2800 may be powered by a electric line, battery, or an on-board gas generator. The configuration illustrated in FIG. 28 may be well-suited for long walls, such as fences or factory and warehouse walls.

FIG. 28 illustrates the robotic system 2800 constructing a straight wall. The direction of the motion is toward the left, as indicated by the arrow shown in FIG. 28. Multiple materials may be used in this implementation, e.g. different materials may be used for outside surfaces and for core structures, respectively.

Figure 29:
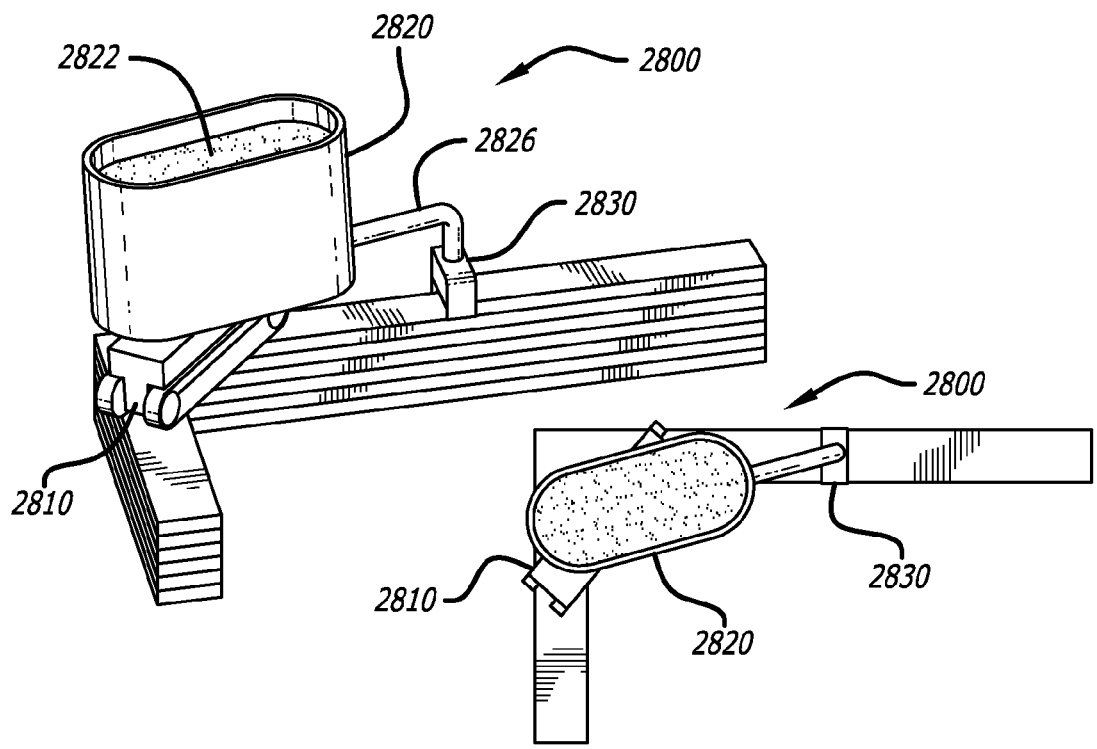
FIG. 29 illustrates the mobile robotic system shown in FIG. 28 being used to create corners.

FIG. 29 illustrates the mobile robotic system shown in FIG. 28 being used to create corners. The nozzle assembly 2826 may rotate, under on-board computer control, with respect to the vertical axis of the feeding tube 2826. Also, the material container 2822 and the feeding tube 2826 to which it is attached can rotate 360 degrees. This allows for creation of various structure shapes, such as corners. Concurrent control of the wheel assembly, rotation of the material container and transfer tube, and the CC nozzle orientation may be used to create various geometrical features.

Figure 30:
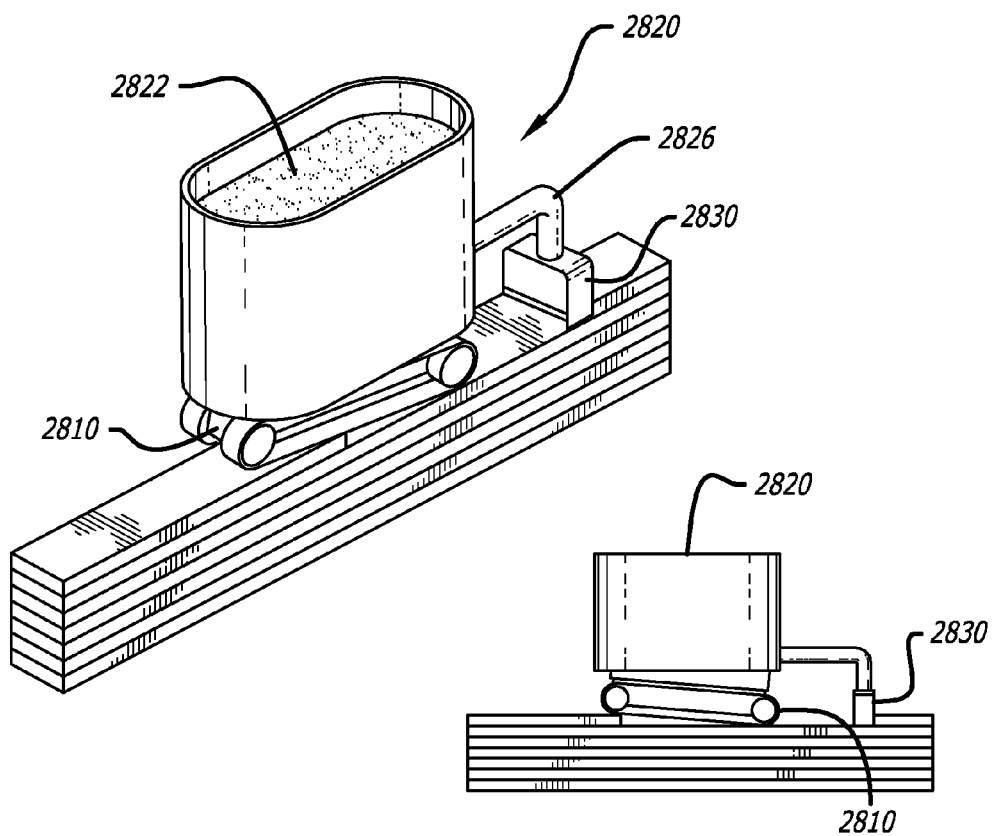
FIG. 30 illustrates the mobile robotic system shown in FIG. 29 climbing from a completed layer to the next layer.

FIG. 30 illustrates the mobile robotic system 2800 shown in FIG. 29 climbing from a completed layer to the next layer. As seen in FIG. 30, the wheel assembly 2810 may swivel, so that the robotic system 2800 may climb each completed layer. The climbing action, combined with a 180 degree rotation of the material container 2822 and the nozzle assembly 2830, may also accomplish the construction of wall ends. The robotic system 2800 may build as much of a wall layer as possible, and when it reaches very close to the end of the layer, it may rotate the nozzle assembly 180 degrees, then move backward to climb the layer just built. Before climbing, the robotic system 2800 may waiting enough for material to cure.

Rigid horizontal members may be used to facilitate the construction of windows, door openings and ceilings by bridging openings beneath them. To create a window, for example, the controller of a nozzle assembly may turn off the flow of material to all outlets in the nozzle assembly when the nozzle assembly is traversing an area that has been designated as the window opening. After the top of the walls surrounding the window have been extruded, a rigid horizontal member may be placed across the top of these walls to create the header of the window. One or more continuous layers of material may then be extruded on top of the header and the surrounding walls. A similar bridging approach may be used to create door openings. A ceiling may similarly be created by placing a series of neighboring structural members across the top walls of a structure, over which material may be extruded to give strength to the structure.

One or more of the robotic systems described above may also be used to place these structural members where needed, i.e., across the tops of window and door openings and across the tops of wall structures to provide a roof.

A variety of techniques may also be employed in an automated fashion to reinforce the strength of walls that are extruded. These techniques may include the automated insertion or embedding of clips across or within the rims of the walls periodically along their length. These reinforcement mechanisms may also include the insertion of rigid vertical members within the interior of the wall, including, in certain embodiments, rigid horizontal links between these vertical members. Again, all of this may be accomplished under automated robotic control.

Figure 31:
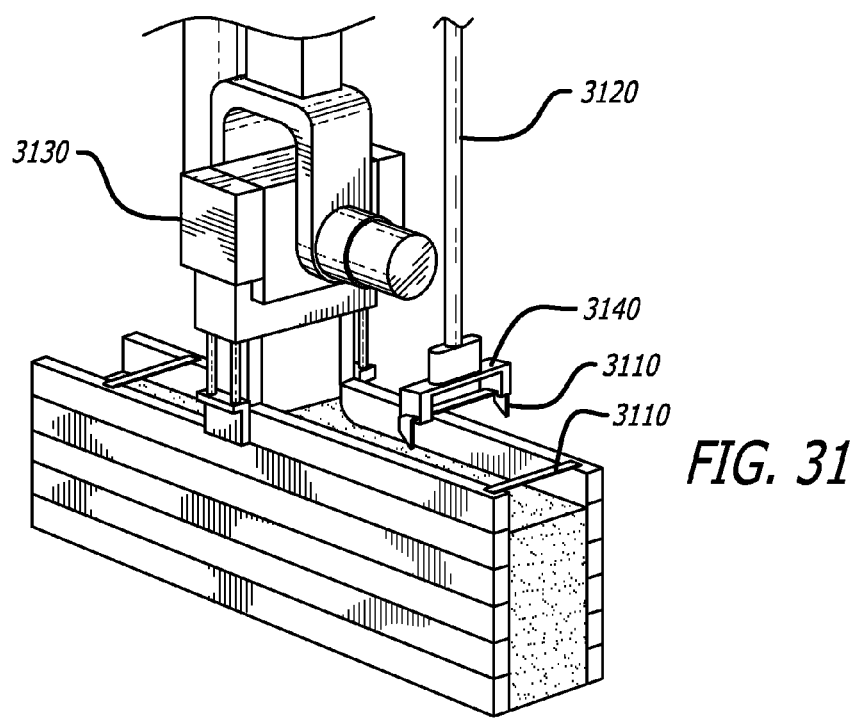
FIG. 31 illustrates insertion of reinforcement staples by a robotic arm coupled to a nozzle assembly.

FIG. 31 illustrates the insertion of reinforcement staples 3110 by a robotic arm 3120 coupled to a nozzle assembly 3130. The controllable robotic arm 3120 may have at its distal end a gripper 3140 configured to pick up a desired element, and deposit the element at a desired position relative to the extruded material.

As shown in FIG. 31, the robotic arm 3120 may insert the reinforcement staples 3110 onto rim material that has just been extruded, in order to further secure the positional accuracy and strength of the rim material. The material for the staples 3110 may be made out of a metal strip or a composite strip, which unrolls from a reel and is cut and shaped into the final form by a mechanism installed on a gantry platform (shown previously) which holds the nozzle assembly 3130.

Figure 32:
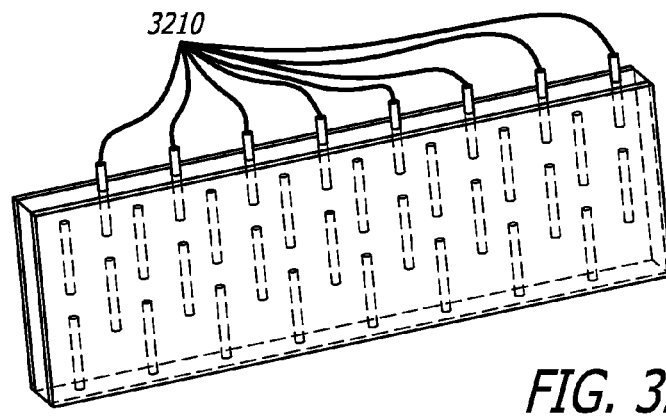
FIG. 32 illustrates vertical rods inserted within a wall for reinforcement.

FIG. 32 illustrates reinforcement of a wall by insertion of vertical rods. To use steel reinforcement for walls, simple steel rod modules 3210 may be used. These modules 3210 may be a few wall layers high, and may be robotically inserted in the wall core material during layer construction. The placement of the rods 3210 may be such that each series overlaps with the previous series, in order to ensure continuity in reinforcement along the wall height.

Figure 33A:
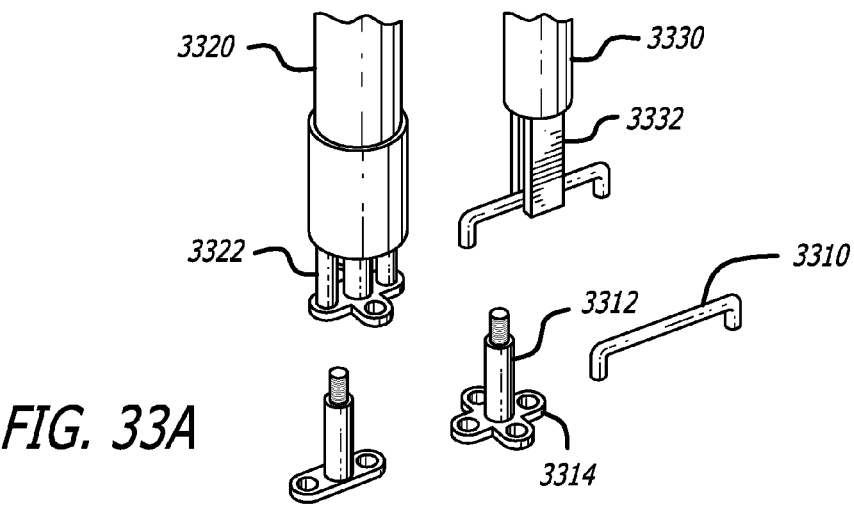
FIGS. 33A, 33B, and 33C illustrate the insertion of reinforcement elements for walls.
Figure 33B:
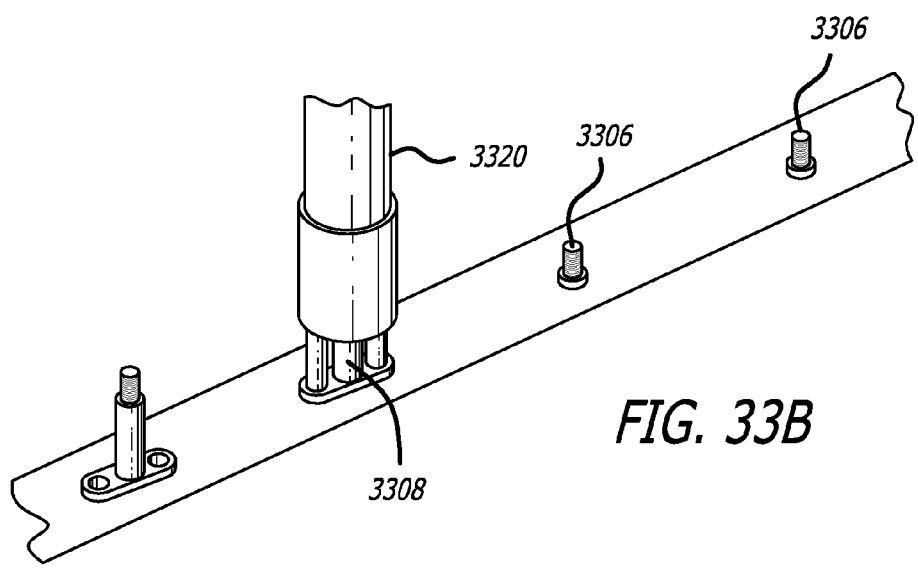
Figure 33C:
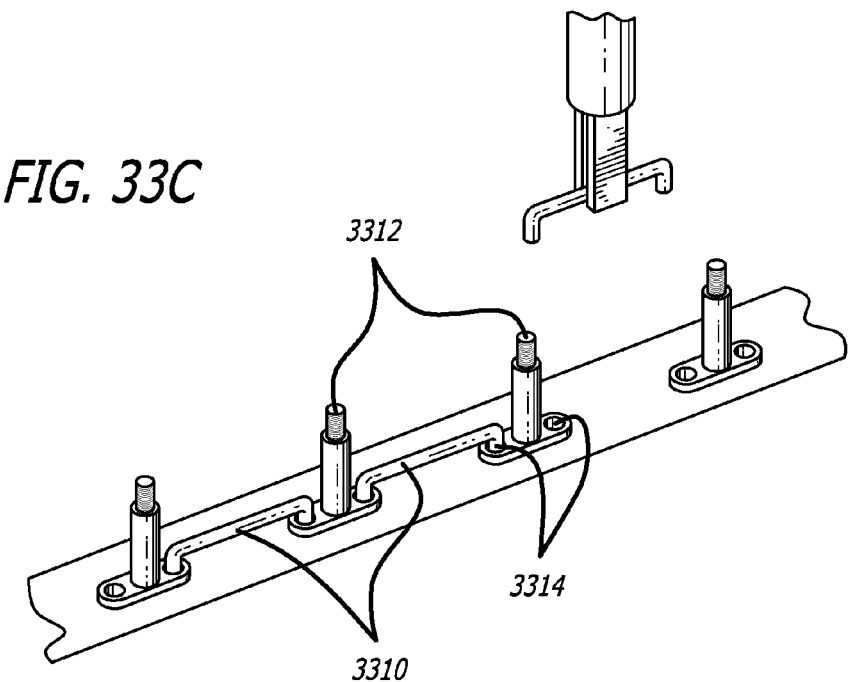

FIGS. 33A, 33B, and 33C illustrate the insertion of reinforcement elements for walls. As shown in FIG. 33A, more complex and stronger steel reinforcement may be built by creating two or three dimensional steel mesh within walls and columns using a progressive and layer wise approach. In the illustrated embodiments of reinforcement structures, three steel elements 3310, 3312, and 3314, as well as two robotic manipulator arms 3320 and 3330 (each having grippers 3322 and 3332) may be used.

As shown in FIG. 33B, a two dimensional mesh may be built for walls by first imbedding rigid vertical members at equal distances, and building a wall rim on their sides using a nozzle assembly as previously described. Several layers may be built by the nozzle assembly to cover one layer of the mesh. A first set of rigid vertical members 3306 that includes an external threaded portion may first be inserted on an extruded layer, leaving the threaded end of the first vertical member uncovered. For each successive mesh layer, a second set of rigid vertical members 3308 may be screwed by a robotic arm 3320 on top of the vertical members 3306 previously embedded at the lower mesh layer.

As shown in FIG. 33C, after assembling each two rigid vertical members 3312, a rigid horizontal link 3310 may be inserted in the corresponding holes 3314 on the base of the vertical elements. The wall fabrication by a nozzle assembly may then continue, and the process may be repeated for the next mesh layer, once an adequate height has been reached.

Figure 34A:
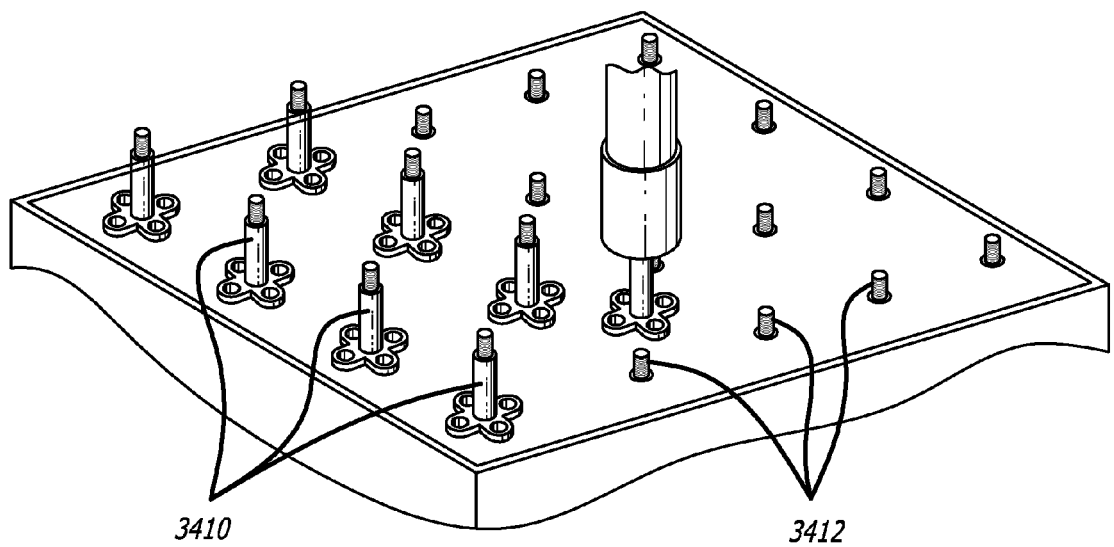
FIGS. 34A, 34B, 34C, 34D illustrate the insertion of reinforcement elements for columns.

FIGS. 34A, 34B, 34C, 34D illustrate the insertion of reinforcement elements for columns. As shown in FIG. 34A, for columns vertical reinforcement elements 3410 may be placed at equal distances on the lattice points of a two dimensional matrix. Each member 3410 may be screwed onto a corresponding element 3412 at a lower mesh layer.

Figure 34B:
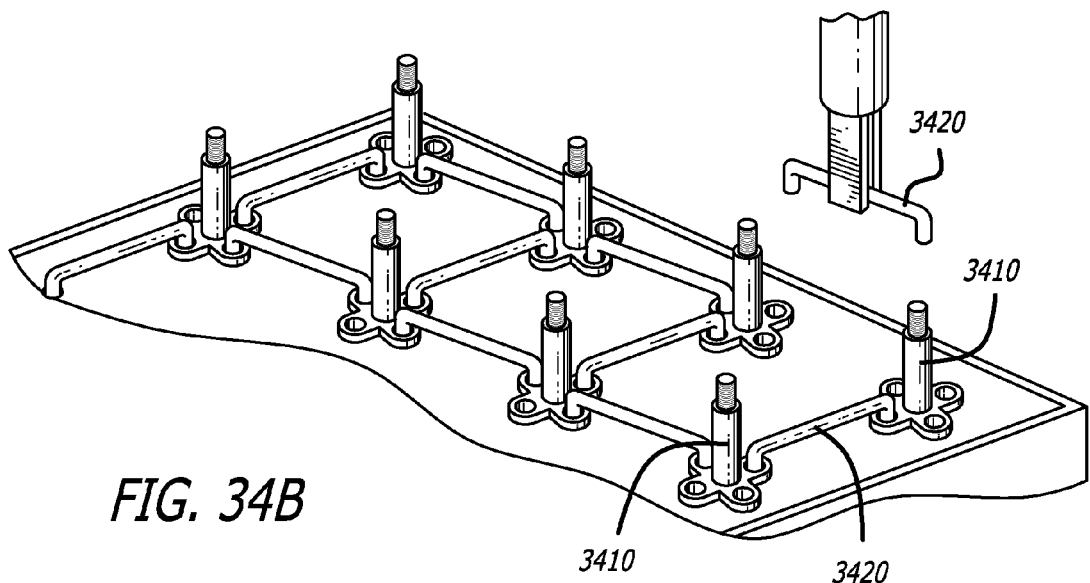

FIG. 34B illustrates rigid horizontal links 3420 which are then inserted between the vertical elements 3410 to create a horizontal 2D reinforcement mesh for each mesh layer.

Figure 34C:
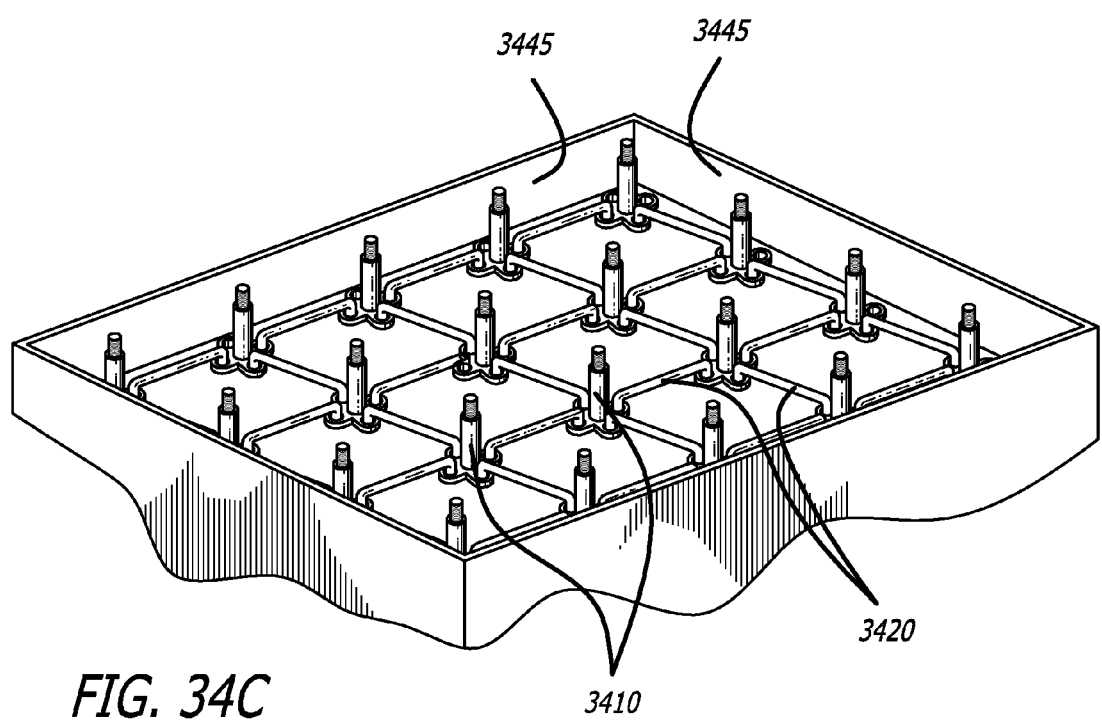

As shown in FIG. 34C, the rims 3445 of the column are then constructed using a single-orifice nozzle assembly, as shown in the FIG. 1 in this disclosure.

Figure 34D:
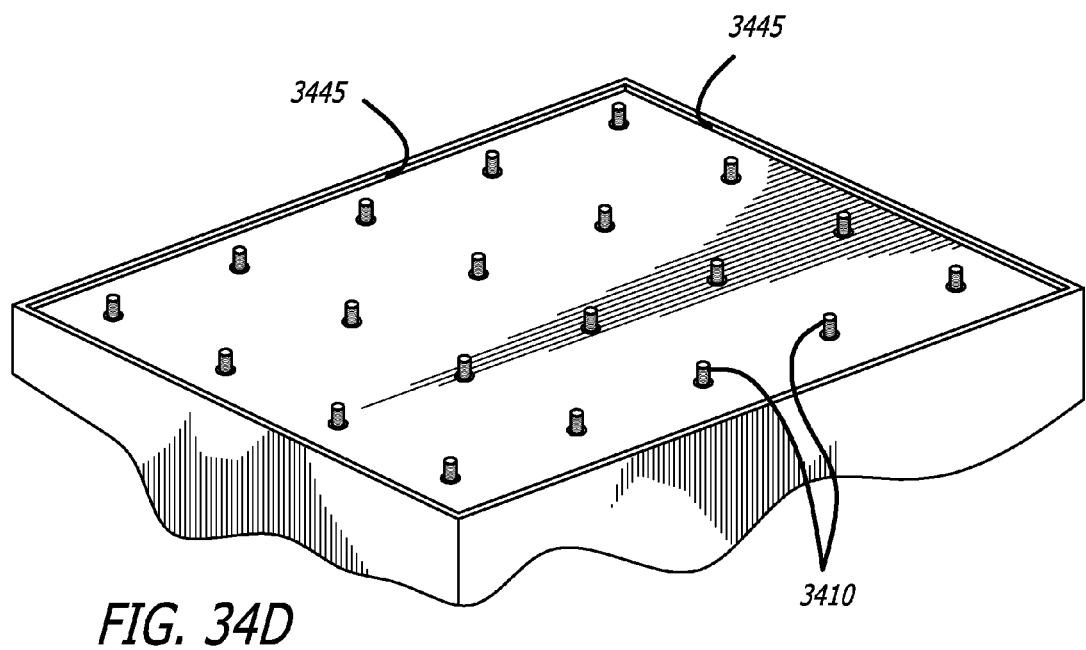

As illustrated in FIG. 34D, the hollow space between the rims 3445 may be filled with filler material, e.g. concrete, and the process may continue for the subsequent layers.

Other types of reinforcement structures and methods may be used. For example, simpler reinforcement modules and/or robotic welding may be used, instead of screwing methods. Welding may not require as much alignment precision as needed for attaching the reinforcement elements by screw action.

Plumbing may also be installed as part of the automated process. Segments of plumbing pipe may be secured to other segments using automated installation and welding techniques.

Figure 35:
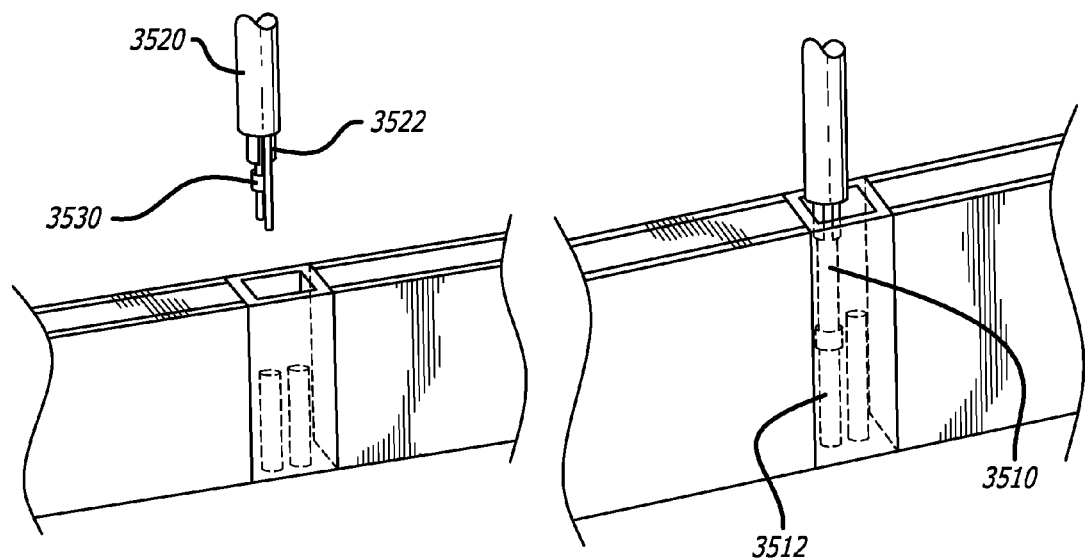
FIG. 35 illustrates the installation of vertical plumbing pipe segments, under automated robotic control.

FIG. 35 illustrates the installation of vertical plumbing pipe segments, under automated robotic control. The robotic systems and associated nozzle assemblies, described above, can build utility conduits within the walls, as shown in FIG. 35. Plumbing automation is thus made possible.

FIG. 35 illustrates a segment 3510 of a metal (e.g. copper or other material) pipe being attached onto a lower pipe segment 3512, after several wall layers have been fabricated. A robotic arm 3520 is shown as delivering the pipe segment 3510 on top of the previously inserted pipe segment 3512. The robotic arm 3520 has a gripper 3522 at a distal end. The gripper 3522 is configured to pick up an element and deposit the element at a desired location relative to the extruded layers. The robotic arm 3520 also has a heater element 3530 at the distal end. The heater element 3530 is shown in FIG. 35 as being shaped as a ring, although heater elements having configurations other than annular configurations may also be used.

In the illustrated embodiment, the inside or outside rim of each pipe segment may be pretreated with a layer of solder. The ring-shaped heater element 3530 may heat the connection area, and melt the solder. Once the alignment is made, the heater element 3530 may bond the two pipe segments together. The heater element may use, for example, a nichrome wire coil which is electrically activated. Alternatively, it may use a gas burner, or other types of heating mechanisms. The robotic arm configuration illustrated in FIG. 3 may be suitable for pipe segments having a substantially vertical and straight configurations. The robotic arm 3520 may have a hollow tubular shape, and include an inner barrel. The pipe segments may be fed through the barrel of the robotic arm from a feeding magazine.

Figure 36:
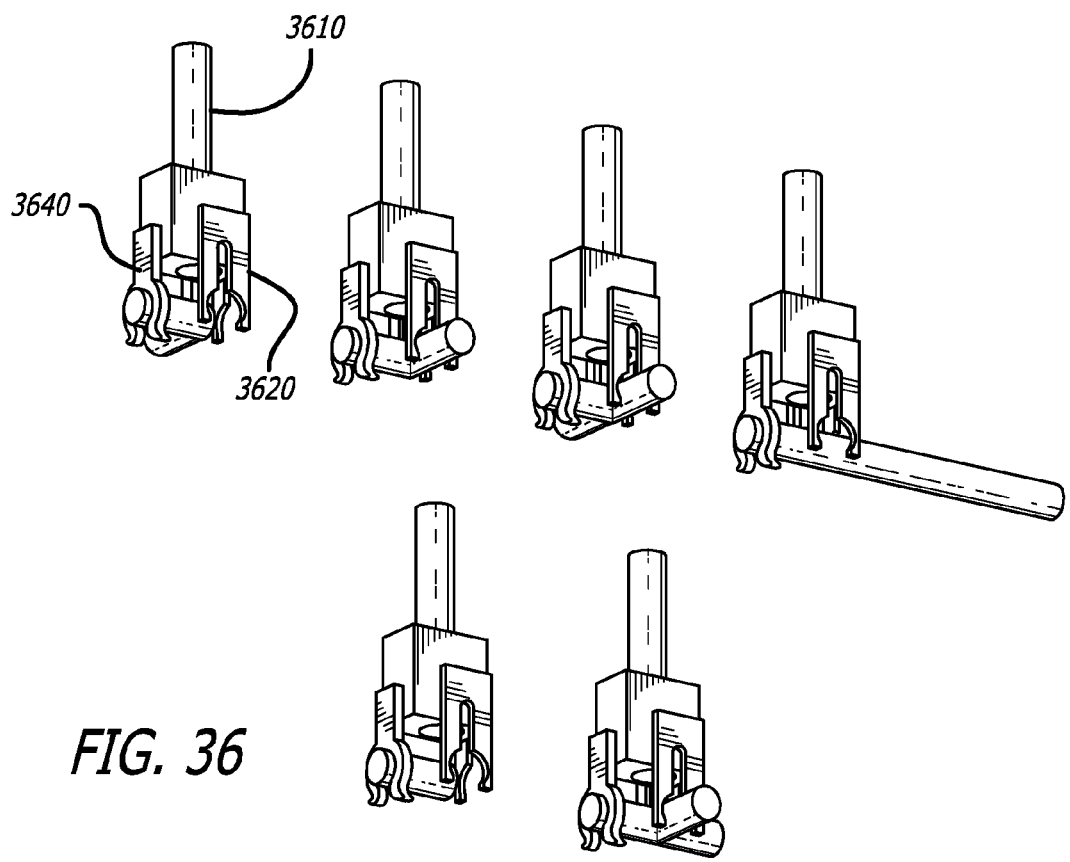
FIG. 36 illustrates a robotic arm including a plurality of grippers configured to grasp desired elements from different orientations.

FIG. 36 illustrates a robotic arm 3610 including a plurality of grippers 3620 (some of which are not fully shown) configured to grasp desired elements from different orientations. The embodiment of the robotic arm illustrated in FIG. 36 shows a universal passive robotic gripper having a three-grippers-in-one configuration, although of course other variations are possible. The robotic arm 3610 also has a heater element 3640. The grippers 3620 at the end of the robotic arm 3610 are capable of picking, holding, and delivering the above plumbing components in the orientations shown in FIG. 36. By simply being lowered onto each of the plumbing components in their magazine rack, each gripper 3620 of the robotic arm 3610 may grab the component. The heater element 3640 may split open, then close to engage the area to be heated.

Figure 37:
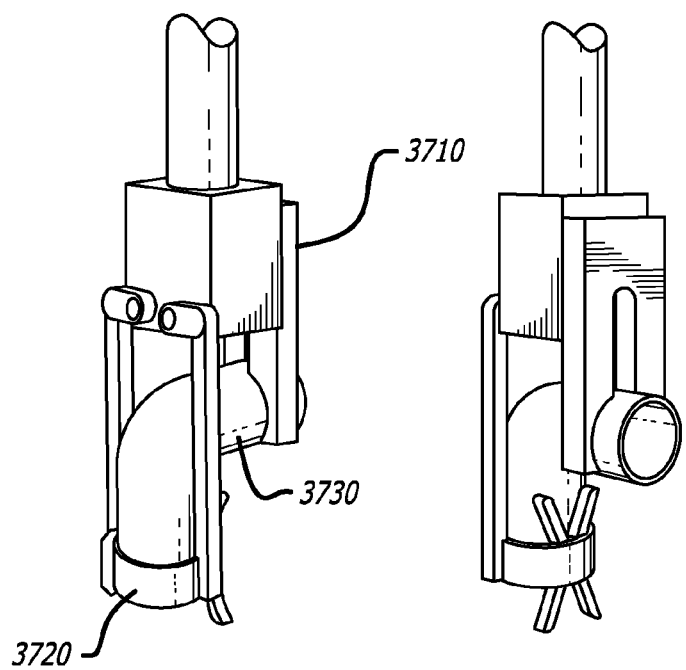
FIG. 37 illustrates a robotic gripper having a movable heater element configured to grasp plumbing pipe segments with downward opening.

FIG. 37 illustrates another embodiment of a robotic gripper 3710 having a movable heater element 3720 configured to grasp plumbing pipe segments 3730 that have a downward opening. The illustrated robotic gripper 3710 is configured to deliver and attach the pipe segments 3730 in the shown orientation. The heater element 3720 is made of two separate sections, i.e. includes a first component and a second component movable from an open position in which the components are space apart to a closed position in which the components are in engagement so as to capture at least a portion of a desired pipe segment. As the gripper 3710 approaches a pipe segment (which is in a magazine) from above, the surface of the pipe segment first pushes the two halves of the heater element 3720 apart to split them open. The pipe segment then passes through, and gets engaged in, the gripper 3710. At this point the heater element halves close and are in engagement to become properly positioned around the desired section of the plumbing segment.

In the previously described plumbing methods, plastic tubing may be used instead of copper tubing. When plastic tubes are used, glue may be applied to the joints prior to connection. Automatic glue dispensing systems may be used in assembly operations.

Figure 38:
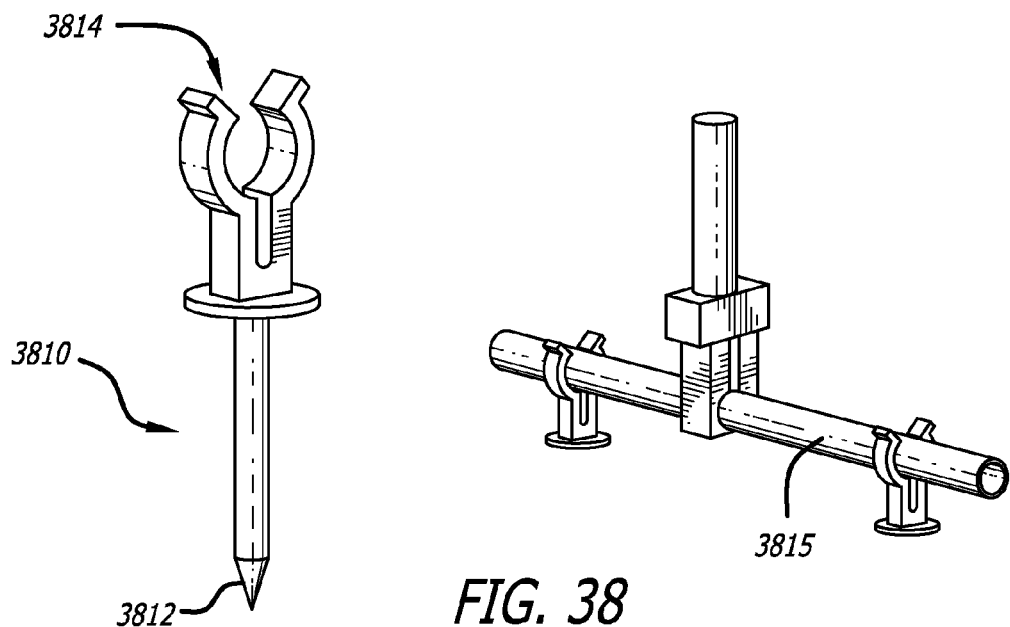
FIG. 38 illustrates installation of horizontal plumbing pipes.

FIG. 38 illustrates the installation of horizontal plumbing pipe segments 3815, for example on floors. For horizontal plumbing on the floor, a plurality of pins 3810 may be used. Each of the pins 3810 may have a sharp end 3812, and have a gripper 3814 at the other end, as shown in FIG. 38. The sharp end 3812 of the pins 3810 may be robotically inserted into the ground, at desired locations. Pipe segments 3815 may then be inserted on the gripper end 3814 of the pins 3810, for secure positioning. Connections and assemblies may then be performed, as explained previously. A network of pipes may be created at various elevations by using pins of various heights.

Once completed, the floor may be covered by construction material, such as concrete, using a nozzle assembly described previously.

The exposed sections of pipes having an upward opening may normally be positioned under the walls which would later be constructed using the extrusion nozzles described earlier. Over each exposed pipe section a conduit may be constructed, and a pipe section may be periodically added to the plumbing network, after a predetermined number of wall layers have been built up.

Figure 39:
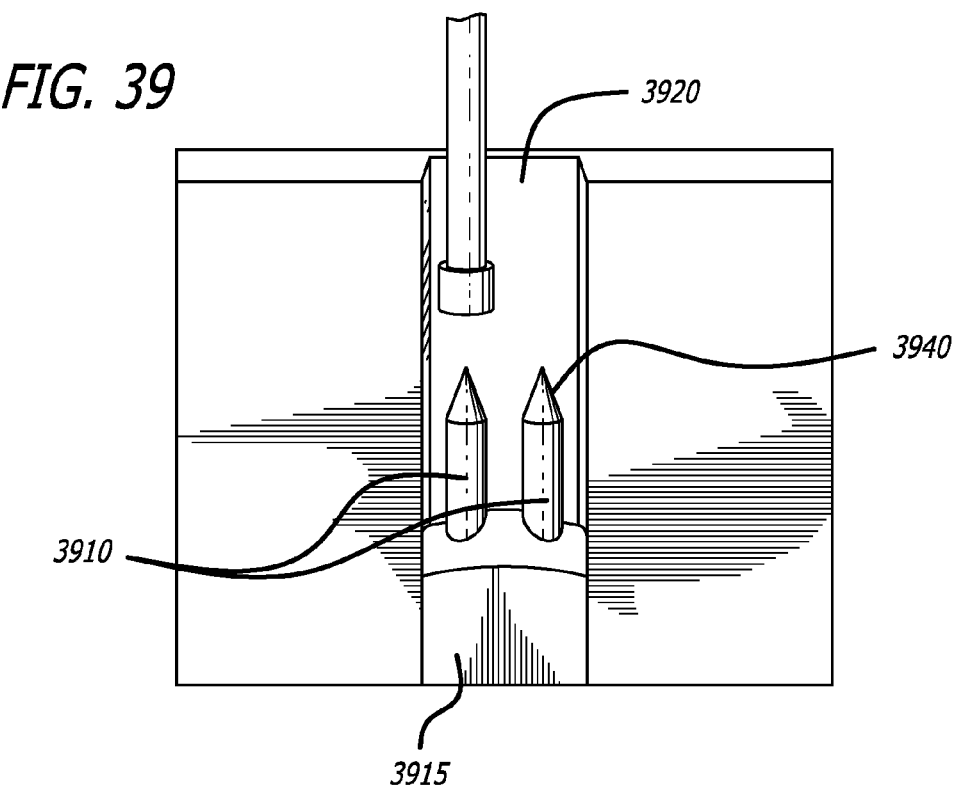
FIG. 39 illustrates alignment of pipe segments, when assembling a plumbing pipe network from the pipe segments.

FIG. 39 illustrates alignment of pipe segments, when assembling a plumbing pipe network. To align pipe segments when assembling a plumbing pipe network, a number of methods may be used, for example injection of foam, and attachment of dissolvable cones.

After placing each pipe segment 3910 within a conduit 3920, a foam 3915 that cures quickly may be injected in the conduit, when using the foam injection method for aligning pipe segments. Once cured, the foam 3915 keeps the pipe segments 3910 in position, and facilitates alignment when adding successive pipe segments.

As another method, by pre-attaching a dissolvable porous cone 3940 to each pipe segment, the alignment task may be greatly simplified. Once the plumbing is completed, running water through the pipes would dissolve and eliminate the cones 3940. The cones may be made of harmless materials such as sugar.

Figure 40:
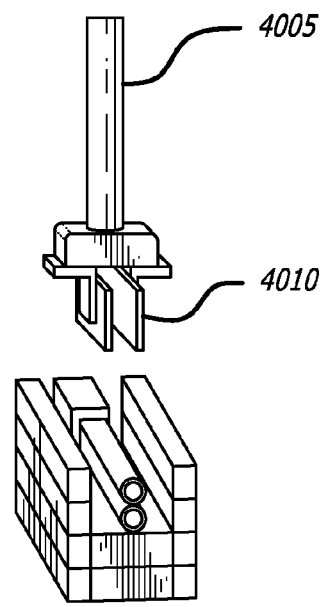
FIG. 40 illustrates the shielding of plumbing networks.

FIG. 40 illustrates the shielding of plumbing networks. As seen in FIG. 40, for maintainability and other purposes the horizontal sections of plumbing networks may be covered by shields 4010. The shields 4010 may be robotically placed by a robotic arm 4005 over the horizontally laid plumbing pipes prior to pouring the wall filler material.

Electrical wiring may similarly be installed as part of the automated process. Electrical wires may be housed in modules that are connected together within the walls, again under robotic control.

Figure 41:
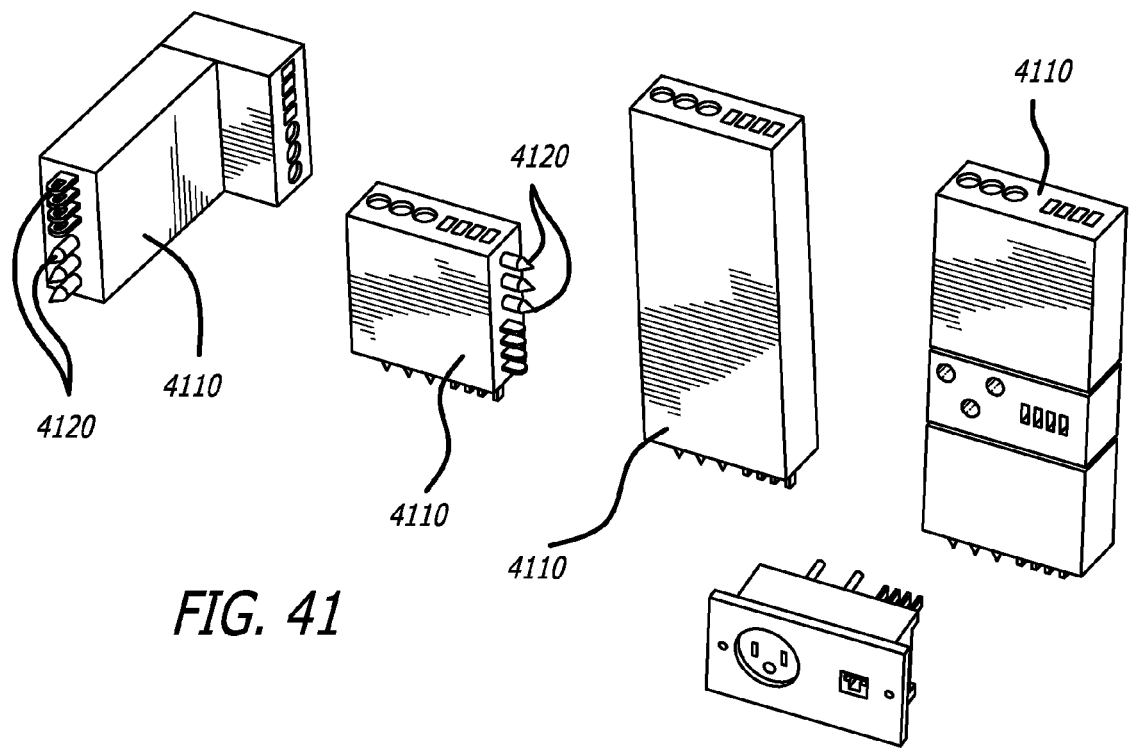
FIG. 41 illustrates electric modules for building electrical and communication networks.

FIG. 41 illustrates electric modules 4110 used in one embodiment of a method and system for automated installation of electrical and communication networks, in the course of constructing a structure using extrusion methods described above. This modular approach may be similar to the approach used in building plumbing networks as described above. The electric modules 4110 shown in FIG. 41 contain segments of wires or other conductive elements, for power and communication lines. These conductive segments are encapsulated in nonconductive blocks, which may be made of nonconductive materials including but not limited to plastic. The ends 4120 of the conductive segments are either conical holes or pins, or have other forms conventionally used in electrical and electronics outlets, jacks, etc. Modules 4110 of many different types of electrical components may be made and used, allowing for the creation of any desired electric network.

Figure 42:
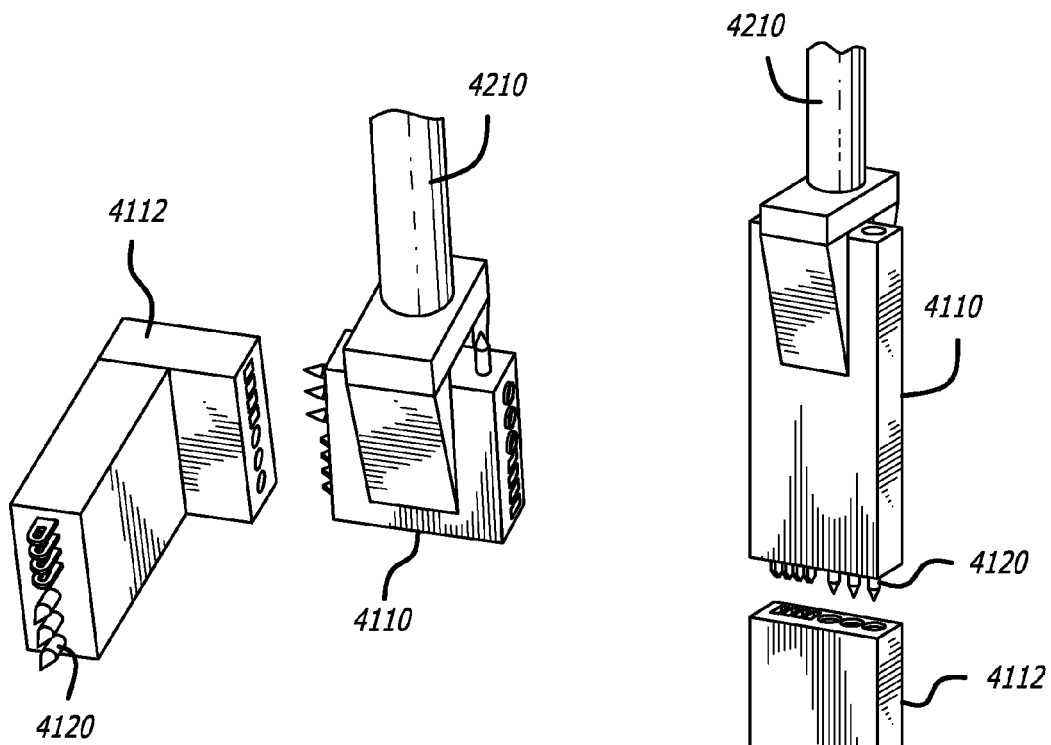
FIG. 42 illustrates a robotic gripper that grasps and interconnect the electric modules shown in FIG. 41.

FIG. 42 illustrates a robotic gripper that grasps and interconnect the electric modules shown in FIG. 41. As shown in FIG. 42, the electric modules 4110 are robotically fed and connected by a robotic gripper 4210, which can perform the task of grabbing a desired electric module 4110, and connecting the grasped module to another matching electric module 4112.

Figure 43:
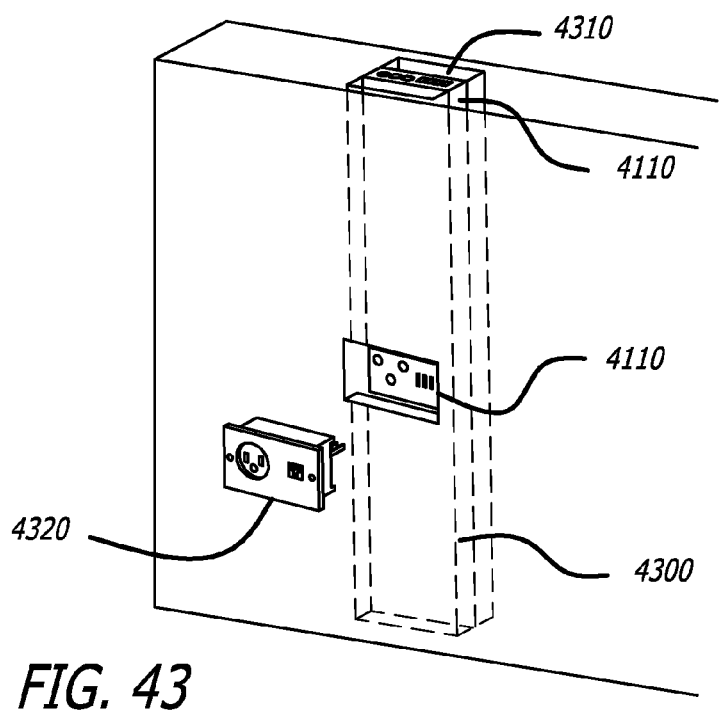
FIG. 43 illustrates the positioning of the electric modules within corresponding openings in the walls.

FIG. 43 illustrates the positioning of the electric modules within conduits built in the walls. As shown in FIG. 43, some of the electric modules 4110 allow for connection of electrical and communication outlets. By automated robotics, these modules 4110 may be positioned behind corresponding conduits 4310 on the walls. The only manual part of the electrical work may be the simple task of inserting fixtures 4320 into the automatically constructed electric network, part of which is shown in FIG. 43 using reference numeral 4300.

Tiling and even painting may similarly be done under robotic control.

Figure 44:
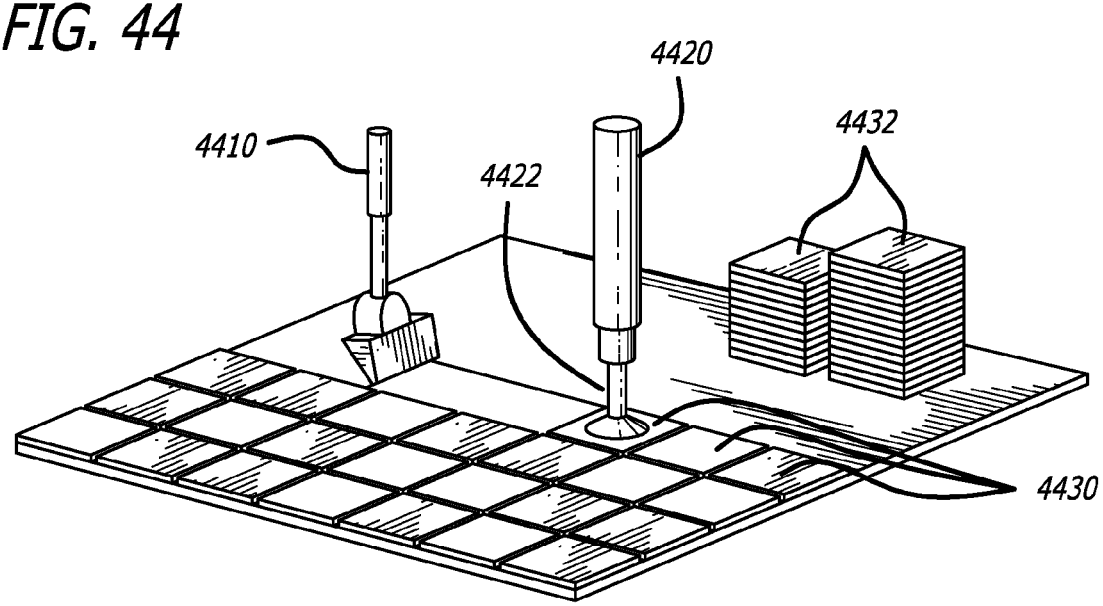
FIG. 44 illustrates automated tiling of floors.

FIG. 44 illustrates automated tiling of floors. As shown in FIG. 44, tiling of floors and walls may be automated by using a first robotic arm 4410 to deliver and spread mortar or adhesive material on the floor, then using another robotic arm 4420 to pick up the tiles 4430 from stacks 4432 of tiles, and accurately place them over the area treated with the adhesive material. The robotic arm 4420 used to pick up the tiles 4430 may have a suction cup gripper 4422 operable to pick up and release the tiles by vacuum suction, as shown in FIG. 44. Other embodiments of the robotic arm 4420 may instead use a simple gripper that grabs the tiles on the edges, for the tile pick-and-place operations.

Figure 45:
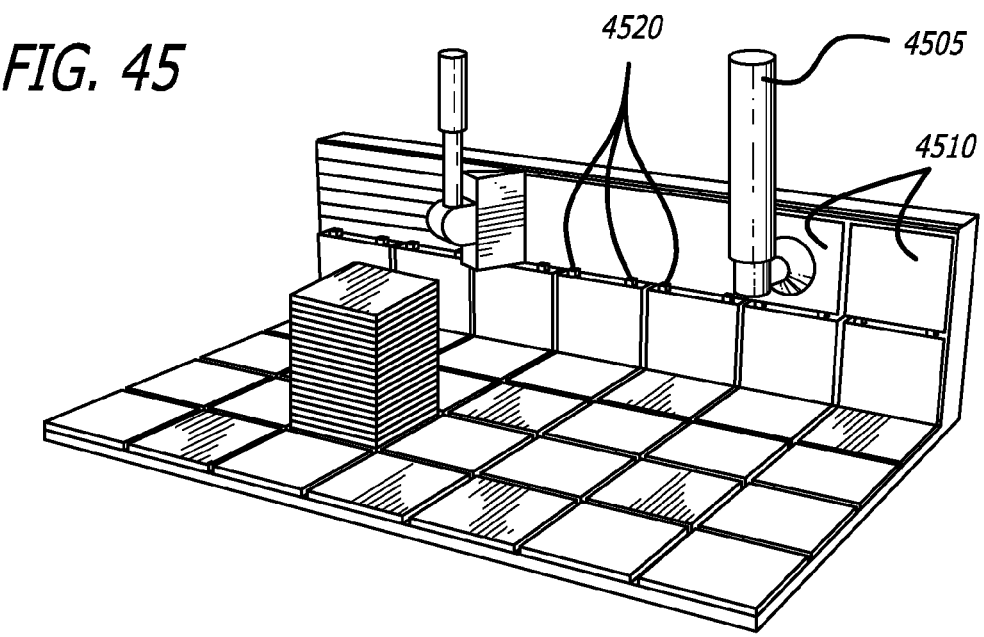
FIG. 45 illustrates automated tiling of walls.

FIG. 45 illustrates automated tiling of walls. The process for tiling of walls is similar to the process for tiling of floors, shown in FIG. 44. Both the material feeding tube (not shown in FIG. 45) and the robotic arm 4505 that picks up the tiles 4510, may tilt to conform to both floor and wall tiling applications. In case of vertical tiling, if a distance is desired between the tiles, a plurality of small spacers 4520 may be placed on one side of each tile which faces upward or downward. The spacers may help stop the drifting of tiles by force of gravity. One of the major time saving aspects of the proposed tiling automation may be the elimination of the task of aligning the tiles, which takes up considerable time during the manual tiling process.

FIG. 46 illustrates automated painting of the surfaces of the structures that have been constructed. A painting system carried at one end of a controllable robotic arm (which is coupled to a nozzle assembly described previously) may be configured to controllably paint a desired pattern on a surface of extruded material, in accordance with a desired specification. After completion of a given number of layers of walls, and before placing the roof, the painting system at the end of the robotic arm may paint every wall of the constructed structure according to desired specifications. The painting mechanism may be a simple roller to which liquid paint is automatically fed, a spray nozzle, or an inkjet printer head, for example inkjet printer heads used for printing large billboards. The inkjet printer painting mechanism may allow wall paper or other desired patterns to be printed on each wall.

As an alternative approach to layer-wise painting, the painting process may be performed after all the walls are completed, and before the roof is made. If mobile robotic systems are used instead of overhead gantry robots, then painting may be performed even after the completion roof construction. In the case of spray painting, positioning accuracy of spray nozzle may not be crucial. In the case of roller painting, a fixed pressure between the roller and the wall surface may be maintained by means of a simple distance or pressure sensor. In the case of inkjet printing, the robotic end-effector carrying the inkjet painting mechanism may include a fine global position sensing/adjusting system, e.g., a laser tracker. The robotic end-effector may also include a sensor to maintain a relatively fixed distance between the inkjet print head and wall surface. For both roller and inkjet painting, the end-effector may conform to possible variations in the wall surface slopes.

FIG. 47 illustrates automated roof construction, for a planar roof. For planar roofs as shown in FIG. 47, beams 4710 may be used. Under each beam 4710, a thin sheet 4720 may be attached, to hold the paste roof material deposited by a nozzle assembly (not shown). The beam 4710 may be robotically picked up and positioned on the sheet 4720 by a robotic arm 4740. The roof may then be covered by suitable material delivered by a nozzle assembly. The edges of the sheets 4720 under the beams 4710 may extend over, to allow for construction of gutter channels by a nozzle assembly. Roof construction may or may not need support beams. Supportless structures such as domes and vaults may be built without beams.

A mixer-extruder assembly may be provided in association with a nozzle assembly to allow the components of a fast-curing material to be mixed near the head of the assembly.

Figure 48A:
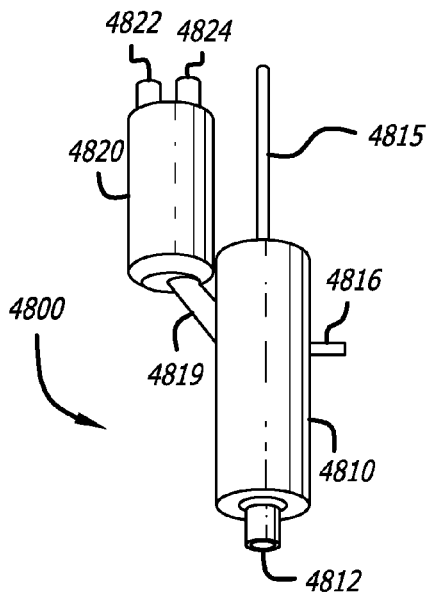
FIGS. 48A and 48B show a mixer-extruder assembly.
Figure 48B:
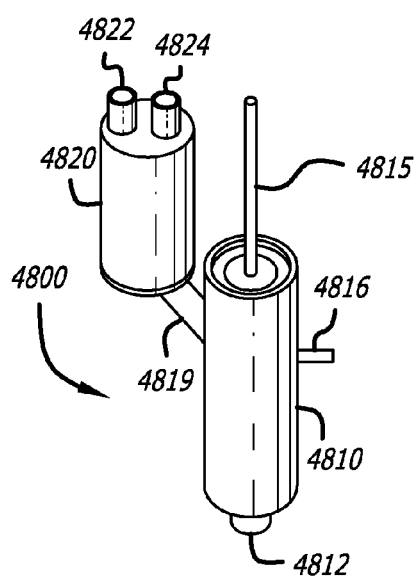

FIGS. 48A and 48B both show a mixer-extruder assembly 4800, viewed from different angles. Construction material (such as concrete) may be delivered in powder form to the mixer-extruder assembly 2800, where the powder may be mixed and extruded substantially concurrently. The mixer-extruder assembly 2800 may be disposed adjacent to a nozzle head (not shown) of a nozzle configured to extrude material.

Such simultaneous mixing and extruding may alleviate some of the difficulties of building structures with extruded paste material. One difficulty is that the material should cure fast enough to sustain the weight of material added at progressive stages, but the material should not cure too fast because it may solidify inside the material storage and delivery systems, such as tanks, bumps, extruders, tubes, etc. Conventional concrete pumping systems may usually deliver low viscosity concrete mix, which is relatively easy to pump or extrude. The fluid-state concrete may typically be poured in a mold which maintains the shape of the cured concrete.

When using the previously described nozzle assembly for construction, typically no mold is used, and therefore the extruded concrete should maintain its shape. This requires a high viscosity concrete paste, which cures much faster than the low viscosity mix. One possibility is to use curing retardant chemicals to control the curing time. This, however, slows the construction process, because it would require a period of time to elapse between the deposition of successive layers. The mixer-extruder assembly may provide a solution by delivering concrete (or other construction material) in powder form near the nozzle head, and then mixing and extruding the power material substantially concurrently.

The mixer-extruder assembly 4800 includes a hollow extrusion chamber 4810 and a hopper 4820 connected to the extrusion chamber 4810 through a channel 4819. The chamber 4810 includes a outlet port 4812 at its lower end, and a fluid inlet port 4816 along a side wall of the chamber. The hopper 4820 has an input port 4822 configured to receive input material therethrough, and an output port 4824 configured to eject exhaust material therethrough. In the illustrated embodiment, the chamber 4810 has a substantially cylindrical configuration symmetrical about a cylinder axis 4815. A nozzle head (not shown) may be connected to the outlet port 4812 of the extrusion chamber 4810. The powder material may be delivered to the hopper 4820 using conventional conveyors or air as transporter. For example, a closed circuit of flexible tubing may be used in which air circulates delivers powder material from a remote tank at the construction site to a hopper 4820 connected to the extrusion chamber 4810. Upon arrival at the hopper 4820, a great portion of the powder settles in the hopper under gravity. When the hopper 4820 is full, the arriving material may simply return to the source tank by means of the return tubing.

Figure 49:
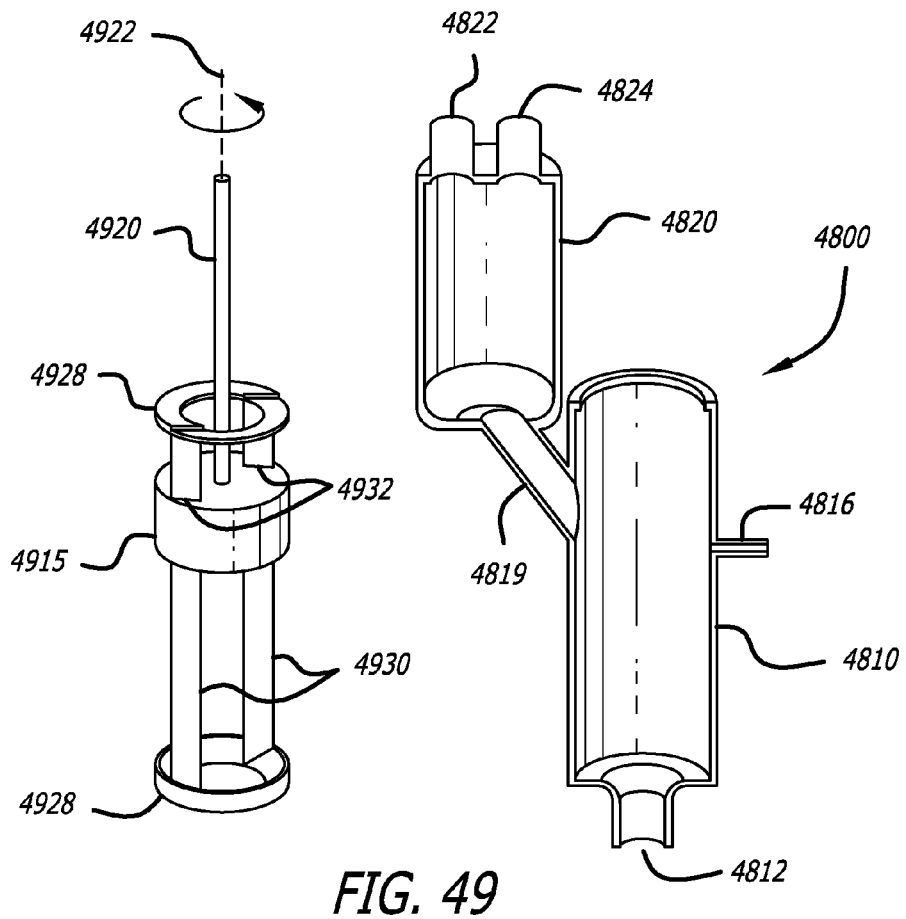
FIG. 49 illustrates a cross-sectional view of the mixer-extruder assembly shown in FIG. 48, as well as a piston drive mechanism inside the extrusion cylinder.

FIG. 49 illustrates a cross-sectional view of the mixer-extruder assembly 4800 shown in FIG. 48, and a piston drive shaft for use in operating the mixer-extruder assembly. As shown in FIG. 49, a piston drive shaft 4920 is provided that has a piston 4915 attached at one end, and can make reciprocal movement along a drive shaft axis 4922, as well as being rotatable about the drive shaft axis 4922. One or more mixer blades are coupled to the piston 4930. In the embodiment of the mixer-extruder assembly illustrated in FIG. 48, two mixing blades 4930 are secured on each end by rigid close rings, and are positioned within respective slots 4932 in the piston 4930 in such a way that they can slide in and out of the slots 4932. The blades 4930 may be positioned at an angle that allows them, upon rotation along the drive shaft axis 4922, to mix and agitate the powder material to which water (or other mixing liquids) have been added through the fluid inlet port 4816 by means of a metering valve (not shown).

Figure 50:
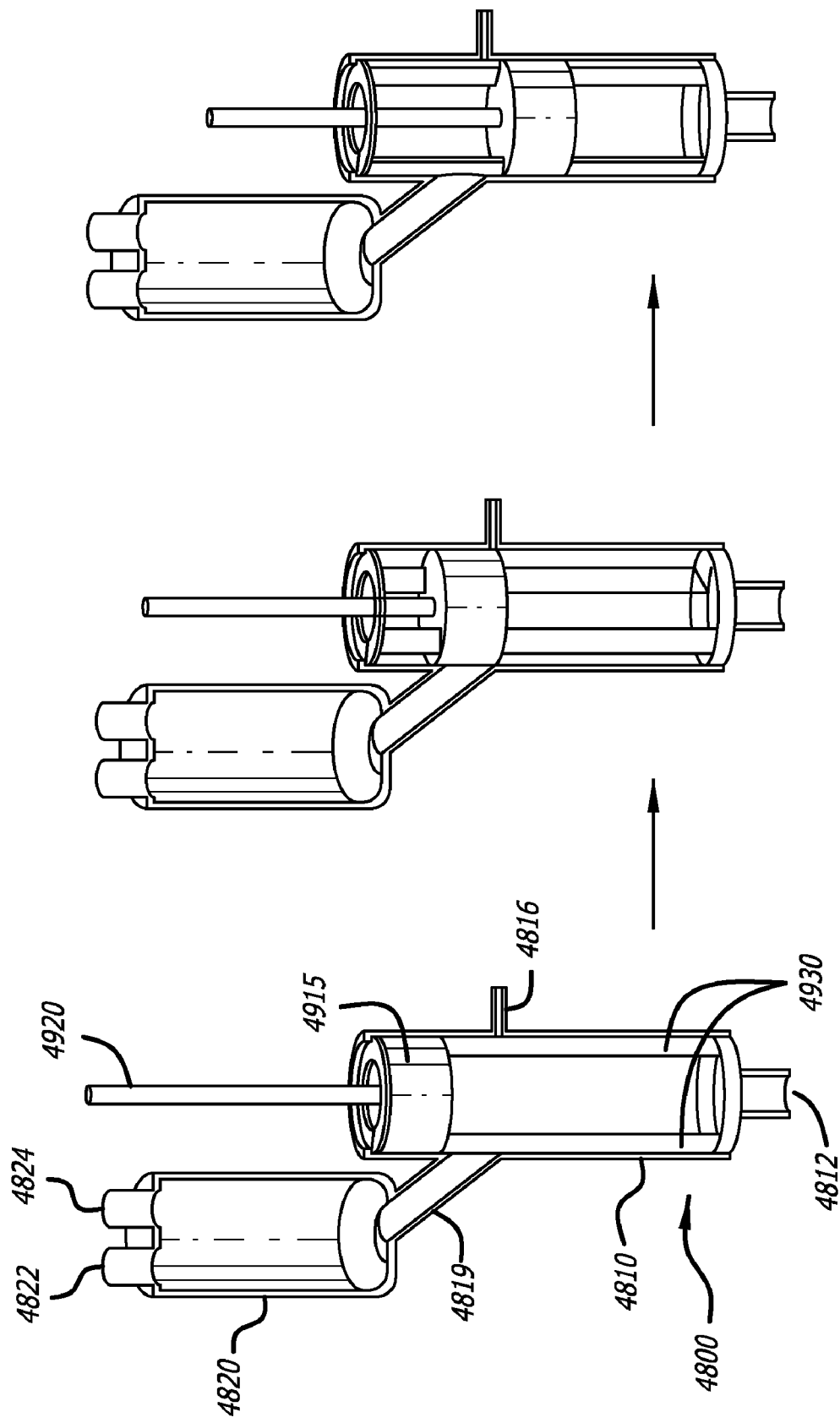
FIG. 50 illustrates the operation of the mixer-extruder assembly shown in FIGS. 48 and 49, as the piston is moved from an upper end of the extrusion chamber toward the outlet port of the chamber.

FIG. 50 illustrates the operation of the mixer-extruder assembly 4800 shown in FIGS. 48 and 49, as the piston 4915 is moved from an upper end of the extrusion chamber 4810 toward the outlet port 4812 of the chamber 4810. The operation of the mixer-extruder assembly 4800 three operational modes or stages. In the first, leftmost stage in FIG. 50, the piston 4915 is shown at its highest position, which is past the opening of the channel 4819 connecting the extrusion chamber 4810 to the powder hopper 4820. In this position, the hopper 4820 may be emptied into the extrusion chamber 4810 by a fixed and known amount, which may be the volume of the cylindrical chamber 4810. A simple low resistance barrier, such as a slotted robber sheet at the outlet port 4812 of the extrusion chamber 4810, may prevent the material from exiting the chamber.

In the second stage, shown in the middle of FIG. 50, the piston is lowered just past the opening of the hopper channel 4819, thereby closing the chamber 4810. At this point the metered mixing liquid is injected into the chamber 4810 through the fluid inlet port 4816, while the piston 4915 rotates, and the blades 4930 perform the mixing and agitation. Agitation typically prevents concrete from setting.

In the third and rightmost stage shown in FIG. 50, the piston 4915 is lowered further, while in rotation, to extrude the paste through the extrusion chamber outlet port 4812, and into the nozzle head (not shown). When the chamber 4810 is emptied, the piston is raised to the initial position (leftmost stage), and the cycle continues anew. The powder hopper 4820 may fill quickly, while extrusion takes place. Two such mechanisms working in parallel, and feeding into the same nozzle, may provide a continuous flow of construction material in paste form. At the end of the operation, the empties cylinder may be cleaned by flushing it with water coming in through the fluid inlet port 4816, while the piston rotates and reciprocates between the second and the third stages.

The extrusion mechanism described in conjunction with FIG. 50 may have numerous applications outside the construction domain, including but not limited to the food processing industry, dental impression, and material mixing and delivery.

As an alternative to the above-described mixer/pump mechanism, single or twin screw pumps with mixing capability may be used with the nozzle assembly described previously.

By combining some or all of the features described above into a single system, the vast majority of a sound and quality structure may be built according to custom specifications very quickly, efficiently, accurately and with few personnel.

Although now having described certain embodiments of nozzle assemblies, robotic systems, and automated construction, it is to be understood that the concepts implicit in these embodiments may be used in other embodiments as well. In short, the protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An automated construction system for constructing a three-dimensional structure, comprising:
   a nozzle assembly configured to extrude material;
   a nozzle assembly controller configured to cause the nozzle assembly to automatically extrude the material in stacked layers that collectively form the three-dimensional structure;
   a controllable robotic arm coupled to the nozzle assembly that is configured to move independently of the nozzle assembly; and
   a robotic arm controller configured to cause the controllable robotic arm to automatically install a plurality of discrete construction components within the extruded three-dimensional structure independent of movement of the nozzle assembly.

2. The automated construction system of claim 1 wherein the construction components include reinforcement staples and wherein the robotic arm and the robotic arm controller are configured to automatically install the reinforcement staples within the extruded three-dimensional structure.

3. The automated construction system of claim 1, wherein the construction components include a first tubular anchor having an external threaded portion and a second tubular anchor having an external threaded portion, and wherein the robotic arm and the robotic arm controller are configured to automatically install the first tubular anchor member within a portion of the extruded three-dimensional structure and screw the second tubular anchor onto the threaded portion of the first tubular anchor.

4. The automated construction system of claim 1, wherein the construction components include a first rigid vertical member, a second vertical member, and a rigid horizontal link, and wherein the robotic arm and the robotic arm controller are configured to automatically install the first rigid vertical member within a portion of the extruded three-dimensional structure, the second rigid vertical member within a portion of the extruded three-dimensional structure and spaced apart from the first rigid vertical member, and the rigid horizontal link between and so as to interlock the first and the second rigid vertical member.

5. The automated construction system of claim 1, wherein the three-dimensional structure includes a wall and wherein the nozzle assembly and the nozzle assembly controller are configured to automatically construct one or more openings within the three-dimensional structure.

6. The automated construction system of claim 5, wherein the construction components include a plumbing pipe, and wherein the robotic arm and the robotic arm controller are configured to automatically install the plumbing pipe within at least one of the openings.

7. The automated construction system of claim 5, wherein the construction components include components of an electric network, and wherein the robotic arm and the robotic arm controller are configured to automatically install at least one of the network components within at least one of the openings and to interconnect the network components to each other.

8. The automated construction system of claim 7, wherein each network component comprises a plurality of conductive segments encapsulated within a block of nonconductive material.

9. The automated construction system of claim 1 wherein the construction components include one or more sensors configured to sense parameters relating to the three-dimensional structure and wherein the robotic arm and the robotic arm controller are configured to automatically install the sensors within the three-dimensional structure.

10. The automated construction system of claim 9, wherein at least one of the parameters is ambient temperature, ambient humidity, or structural deformation.

11. The automated construction system of claim 1, wherein the three-dimensional structure includes a wall and a column.

* * * * *